US009090369B2

(12) United States Patent
Ohta

(10) Patent No.: US 9,090,369 B2
(45) Date of Patent: Jul. 28, 2015

(54) LABEL STICKING APPARATUS

(75) Inventor: Keiji Ohta, Nagano (JP)

(73) Assignee: NIDEC SANKYO CORPORATION (JP)

( * ) Notice: Subject to any disclaimer, the term of this patent is extended or adjusted under 35 U.S.C. 154(b) by 72 days.

(21) Appl. No.: 13/997,004

(22) PCT Filed: Nov. 16, 2011

(86) PCT No.: PCT/JP2011/076347

§ 371 (c)(1),
(2), (4) Date: Jun. 21, 2013

(87) PCT Pub. No.: WO2012/090609

PCT Pub. Date: Jul. 5, 2012

(65) Prior Publication Data

US 2013/0284376 A1 Oct. 31, 2013

(30) Foreign Application Priority Data

Dec. 27, 2010 (JP) ................................ 2010-289142

(51) Int. Cl.

*B29C 65/50* (2006.01)
*B32B 37/26* (2006.01)
*B65C 9/00* (2006.01)
*B65C 9/06* (2006.01)

(Continued)

(52) U.S. Cl.

CPC ............ *B65C 9/0006* (2013.01); *B65C 9/1869* (2013.01); *B65C 9/30* (2013.01); *B65C 9/42* (2013.01); *B65C 2009/0093* (2013.01); *Y10T 156/17* (2015.01)

(58) Field of Classification Search

CPC B29C 66/00441; B65C 1/021; B65C 9/0006; B65C 2009/0093; B65C 9/1869; B65C 9/30; B65C 9/42; B65C 11/004; B32B 37/0053; Y10T 156/17

USPC ....... 156/537, 540, 552, 555, DIG. 1, DIG. 2, 156/DIG. 25, DIG. 27, DIG. 33, DIG. 39, 156/DIG. 42, DIG. 47

See application file for complete search history.

(56) References Cited

U.S. PATENT DOCUMENTS 6,419,782 B1 * 7/2002 Johnson et al. ............... 156/277

FOREIGN PATENT DOCUMENTS

JP 64-20415 U 2/1989
JP 9-66921 A 3/1997

(Continued)

OTHER PUBLICATIONS

Machine Translation of JP 2004-331100 (Oct. 29, 2014).*

(Continued)

*Primary Examiner* — Sing P Chan

(74) *Attorney, Agent, or Firm* — Cantor Colburn LLP

(57) ABSTRACT

A label sticking apparatus may include a release paper supply part in which a release paper held; a release paper collecting part in which the release paper is held; a release paper feed mechanism structured to feed the release paper from the release paper supply part to the release paper collecting part; a label peeling mechanism structured to bend the release paper and peel the adhesive label from the release paper; and a label pressing mechanism structured to press the adhesive label against the adhered medium. The label peeling mechanism may include a movable member which is movable between a bending position where the release paper is bent so that the adhesive label is peeled from the release paper and a bending relaxing position where a bending state of the release paper is relaxed so that the adhesive label is not peeled from the release paper.

18 Claims, 14 Drawing Sheets

(51) Int. Cl.

| | |
|---|---|
| ***B65C 9/08*** | (2006.01) |
| ***B65C 9/18*** | (2006.01) |
| ***B65C 9/30*** | (2006.01) |
| ***B65C 9/42*** | (2006.01) |

(56) References Cited

FOREIGN PATENT DOCUMENTS

| | | | |
|---|---|---|---|
| JP | 2004-231267 | A | 8/2004 |
| JP | 2004-331100 | A | 11/2004 |
| JP | 2007-168871 | A | 7/2007 |
| JP | 2008-174247 | A | 7/2008 |
| JP | 2008-189359 | A | 8/2008 |
| JP | 2011-11890 | A | 1/2011 |

OTHER PUBLICATIONS

International Search Report for International Application No. PCT/JP2011/076347, mailed Feb. 21, 2012, with English translation.

* cited by examiner

LABEL STICKING APPARATUS

CROSS REFERENCE TO RELATED APPLICATIONS

This is a U.S. national stage of International Application No. PCT/JP2011/076347, filed on Nov. 16, 2011. Priority under 35 U.S.C. §119(a) and 35 U.S.C. §365(b) is claimed from Japanese Application No. 2010-289142 filed on Dec. 27, 2010, the disclosure of which is also incorporated herein by reference.

TECHNICAL FIELD

The present invention relates to a label sticking apparatus in which an adhesive label is peeled from a belt-shaped release paper where a plurality of adhesive labels is temporarily adhered and is stuck to an adhered medium.

BACKGROUND

Conventionally, a sheet sticking apparatus has been known in which an adhesive sheet is stuck to a semiconductor wafer (see, for example, Patent Literature 1). In a sheet sticking apparatus described in Patent Literature 1, a plurality of adhesive sheets is temporarily adhered on a release sheet at a predetermined interval and the release sheet before the adhesive sheets are peeled is wound around a support shaft and the release sheet after the adhesive sheets are peeled is wound around a winding shaft. Further, the release sheet is stretched between the support shaft and the winding shaft so that, after the release sheet is passed between a tension adjusting roller and a pinch roller and turned back by a peeling plate, the release sheet is passed between a feeding roller and a pinch roller and wound around the winding shaft.

In the sheet sticking apparatus described in Patent Literature 1, an adhesive sheet is peeled from a release sheet by sharply turning back the release sheet at a front end part of the peeling plate. Further, in the sheet sticking apparatus, a peeled adhesive sheet is pressed against the surface of a semiconductor wafer by a pressing roller and the adhesive sheet is stuck to the semiconductor wafer.

[PTL 1] Japanese Patent Laid-Open No. 2008-174247

In order to stick an adhesive sheet to a predetermined position of a semiconductor wafer, it is required that a tip end of an adhesive sheet temporarily adhered on a release sheet is aligned with a predetermined reference position and, after aligning a tip end of a semiconductor wafer with a predetermined reference, feeding of the release sheet and movement of the semiconductor wafer are synchronized with each other to stick the adhesive sheet to the semiconductor wafer.

In the sheet sticking apparatus described in Patent Literature 1, a release sheet is sharply turned back at a front end part of a peeling plate. Therefore, in a case that a tip end of an adhesive sheet temporarily adhered on a release sheet has been passed through the reference position due to a cause such as a power failure, when the release sheet is fed toward the winding shaft for aligning a tip end of the next adhesive sheet with the reference position, the adhesive sheet whose tip end has been passed through the reference position is peeled from the release sheet. Accordingly, in the sheet sticking apparatus described in Patent Literature 1, it is required that the feeding roller is rotated in a reverse direction to feed the release sheet toward the support shaft and the tip end of the adhesive sheet having been passed through the reference position is returned to the reference position. In other words, in the sheet sticking apparatus, in a case that a tip end of an adhesive sheet has passed through the reference position, the feeding roller is required to be reversed so that the tip end of the adhesive sheet having passed the reference position is returned to the reference position and, as a result, the structure of the drive mechanism for the feeding roller may be complicated.

SUMMARY

In view of the problem described above, at least an embodiment of the present invention provides a label sticking apparatus in which, even in a case that a tip end of an adhesive label temporarily adhered on the release paper has passed through a predetermined reference position, a tip end of an adhesive label is capable of being aligned with the reference position without reversing the release paper feed mechanism for feeding the release paper in a belt shape on which a plurality of adhesive labels is temporarily adhered and without peeling an adhesive label from the release paper.

In order to attain the above, at least an embodiment of the present invention provides a label sticking apparatus in which an adhesive label is peeled from a release paper formed in a belt shape on which a plurality of adhesive labels is temporarily adhered at a predetermined interval and the adhesive label is stick on an adhered medium. The label sticking apparatus includes a release paper supply part in which a release paper before the adhesive label is peeled is held, a release paper collecting part in which the release paper after the adhesive label is peeled is held, a release paper feed mechanism structured to feed the release paper from the release paper supply part to the release paper collecting part, a label peeling mechanism structured to bend the release paper and peel the adhesive label from the release paper between the release paper supply part and the release paper collecting part, and a label pressing mechanism structured to press the adhesive label peeled by the label peeling mechanism against the adhered medium. The label peeling mechanism includes a movable member which is movable between a bending position where the release paper is bent so that the adhesive label is peeled from the release paper and a bending relaxing position where a bending state of the release paper is relaxed so that the adhesive label is not peeled from the release paper.

In the label sticking apparatus in accordance with at least an embodiment of the present invention, the label peeling mechanism structured to bend the release paper to peel an adhesive label from the release paper includes a movable member which is movable between a bending position where the release paper is bent so that an adhesive label is peeled from the release paper and a bending relaxing position where a bending state of the release paper is relaxed so that the adhesive label is not peeled from the release paper. Therefore, when the movable member is moved to the bending relaxing position, the release paper can be fed toward the release paper collecting part by the release paper feed mechanism without peeling an adhesive label from the release paper.

Accordingly, in a case that a tip end of an adhesive label temporarily adhered on the release paper has passed through a predetermined reference position due to some cause such as a power failure, a tip end of the next adhesive label can be fed to the reference position without peeling the adhesive label whose tip end has passed through the reference position. As a result, in at least an embodiment of the present invention, in a case that a tip end of an adhesive label which is temporarily adhered to the release paper has passed through the reference position, the release paper is not required to be returned to the release paper supply part by the release paper feed mechanism (in other words, the release paper feed mechanism is not required to be reversed) and a tip end of an adhesive label can be aligned with the reference position without peeling an adhesive label from the release paper.

In at least an embodiment of the present invention, in a case that a face of the release paper on a side where the adhesive label is temporarily adhered is referred to as a front face, and that a face of the release paper on an opposite side to the front face is referred to as a rear face, for example, the label peeling mechanism includes a fixed shaft which is disposed in a passing route of the release paper from the release paper supply part to the release paper collecting part and is structured to abut with the front face of the release paper when the movable member is located at the bending position, and the movable member located at the bending position is abutted with the rear face of the release paper, and the release paper is bent by the movable member located at the bending position and the fixed shaft to peel the adhesive label from the release paper.

Further, in this case, for example, the label sticking apparatus includes a medium feeding passage through which an adhered medium is fed and, when the movable member is located at the bending position, an abutting portion of the movable member with the release paper is located at a nearer position to the medium feeding passage than the fixed shaft and, when the movable member is located at the bending relaxing position, the abutting portion of the movable member with the release paper is located at a separated position from the medium feeding passage with respect to the fixed shaft.

In at least an embodiment of the present invention, it is preferable that the movable member includes a shaft member structured to abut with the rear face of the release paper and a shaft holding member which holds the shaft member, and the shaft holding member is turnable between the bending position and the bending relaxing position, and the shaft holding member is formed in a bent hook shape so as to prevent interference with the fixed shaft when the movable member is turned from the bending relaxing position to the bending position. According to this structure, for example, in comparison with a case that a movable member is straightly moved between the bending position and the bending relaxing position, disposing space of the movable member can be narrowed. Therefore, the size of the label sticking apparatus can be reduced.

In at least an embodiment of the present invention, it is preferable that the label sticking apparatus includes a label cartridge to which the release paper supply part and the release paper collecting part are attached, and a main body part to which the label cartridge is capable of being attached and from which the label cartridge is capable of being detached, and the main body part includes an upper frame part which structures an upper face portion of the main body part and a lower main body part which turnably holds the upper frame part, and the movable member is movably held by the upper frame part, and the upper frame part is turnable with respect to the lower main body part between a closed position where the label cartridge is sandwiched and fixed between the upper frame part and the lower main body part and an open position where an upper side of the label cartridge is opened so that the label cartridge is capable of being detached to an upper side.

According to this structure, the release paper can be bent by the movable member to peel an adhesive label from the release paper and, in addition, when the upper frame part is turned to the open position with respect to the lower main body part, the label cartridge can be detached or can be attached. In other words, although the release paper can be bent by the movable member to peel an adhesive label from the release paper, the label cartridge can be easily detached from the main body part and easily attached to the main body part. Further, according to this structure, the label cartridge can be detached to an upper side with respect to the lower main body part and attached to the lower main body part from an upper side. Therefore, for example, even when other apparatuses are disposed closely around the label sticking apparatus, the label cartridge can be easily detached and attached. Further, the release paper can be set to the release paper supply part and the release paper collecting part in a state that the label cartridge is detached from the main body part and thus the release paper is easily set.

In at least an embodiment of the present invention, in a case that a face on an opposite side to an adhesive face of the adhesive label is a counter-adhesive face, for example, the label pressing mechanism includes a pressing roller, which is capable of being abutted with the counter-adhesive face of the adhesive label, and a pressing roller moving mechanism structured to move the pressing roller between a pressing position where the pressing roller is abutted with the counter-adhesive face of the adhesive label to press the adhesive label against the adhered medium and a retreated position where the pressing roller is separated from the counter-adhesive face of the adhesive label.

In at least an embodiment of the present invention, it is preferable that the label sticking apparatus includes a label tip end detection mechanism structured to detect a tip end of the adhesive label which is peeled from the release paper by the label peeling mechanism. According to this structure, a tip end of an adhesive label which is peeled from the release paper is detected and the tip end of the adhesive label and an adhered medium can be aligned with each other and thus accuracy of the sticking position of the adhesive label to the adhered medium can be enhanced. Further, according to this structure, it can be detected whether a tip end side of an adhesive label is peeled by the label peeling mechanism or not and thus a sticking failure of an adhesive label is prevented beforehand.

In at least an embodiment of the present invention, it is preferable that, in a case that a face on an opposite side to an adhesive face of the adhesive label is a counter-adhesive face, the label pressing mechanism includes a pressing roller which is capable of being abutted with the counter-adhesive face of the adhesive label, the label tip end detection mechanism includes a light emitting element and a light receiving element which are disposed so as to interpose a tip end side of the adhesive label peeled from the release paper by the label peeling mechanism, and the pressing roller is formed with a groove part through which light from the light emitting element toward the light receiving element is passed so as to be recessed to an inner side in a radial direction. According to this structure, the label tip end detection mechanism and the pressing roller can be disposed at a further nearer position to the tip end side of an adhesive label which is peeled from the release paper by the label peeling mechanism. Therefore, even when a peeled amount of the tip end side of an adhesive label from the release paper is small, the tip end of the adhesive label can be appropriately detected by the label tip end detection mechanism, and the tip end side of the adhesive label can be appropriately pressed against an adhered medium by the pressing roller. As a result, a sticking failure of an adhesive label can be prevented effectively. Further, an adhesive label whose total length is short can be appropriately stuck to an adhered medium.

In at least an embodiment of the present invention, it is preferable that the label sticking apparatus includes a label sticking detection mechanism structured to detect that the adhesive label has been stuck on the adhered medium. According to this structure, a sticking failure of an adhesive label can be detected appropriately.

In at least an embodiment of the present invention, it is preferable that, in a case that a face on an opposite side to an adhesive face of the adhesive label is a counter-adhesive face, a bar-code pattern in a bar-code shape is printed on the counter-adhesive face of the adhesive label, and the label sticking detection mechanism is a reflection type optical sensor for detecting the bar-code pattern. According to this structure, it can be detected whether or not an adhesive label is appropriately stuck on an adhered medium without being folded by detecting on-off signals outputted from the label sticking detection mechanism. Further, according to this structure, a sticking failure of an adhered medium can be appropriately detected regardless of ground colors of the adhered medium.

In at least an embodiment of the present invention, it is preferable that the release paper supply part includes a supply side winding core around which the release paper is wound, a supply side rotation shaft and a supply side friction member which are integrally rotated with the supply side winding core, a rotation member which is turnable with respect to the supply side rotation shaft and is held by the supply side rotation shaft, a supply side friction urging member which urges the supply side friction member toward the rotation member, and a rotation urging member which urges the rotation member to a counter-supply rotating direction which is an opposite direction to a supply rotating direction that is a rotating direction of the supply side winding core when the release paper is fed from the release paper supply part to the release paper collecting part. The supply side friction member is urged toward the rotation member by the supply side friction urging member so that the rotation member is turned over a predetermined angle to the supply rotating direction together with the supply side winding core when the release paper is fed from the release paper supply part to the release paper collecting part.

In other words, it is preferable that, at least in a predetermined angular range, a frictional force between the supply side friction member and the rotation member based on an urging force of the supply side friction urging member is larger than a slip force between the supply side friction member and the rotation member based on an urging force of the rotation urging member. According to this structure, in a predetermined angular range, the rotation member is turned together with the supply side winding core in a supply rotating direction and an urging force in a counter-supply rotating direction stored in the rotation urging member is transmitted to the supply side winding core through the supply side friction member. Therefore, even when the label sticking mechanism is not provided with a separate structure for applying a tensile force to the release paper, a tensile force is applied to the release paper. As a result, an adhesive label is appropriately peeled from the release paper while simplifying the structure of the label sticking mechanism.

In a case that a tip end of an adhesive label temporarily adhered on the release paper has passed through a predetermined reference position, if the supply side winding core is structured to be capable of being rotated in a reverse direction for aligning the tip end of the adhesive label with the reference position, the mechanism for rotating the supply side winding core in a reverse direction becomes complicated. However, according to at least an embodiment of the present invention, in a case that a tip end of an adhesive label temporarily adhered on the release paper has passed through a predetermined reference position, the supply side winding core is not required to be rotated in a reverse direction and a tip end of an adhesive label can be aligned with the reference position without peeling an adhesive label from the release paper and thus an above-mentioned complicated mechanism is not required.

In at least an embodiment of the present invention, it is preferable that the release paper feed mechanism includes a release paper feed roller structured to feed the release paper toward the release paper collecting part, and a feed roller drive mechanism structured to drive at least the release paper feed roller. Further, the release paper collecting part includes a wind-up side winding core around which the release paper is wound, a wind-up side rotation shaft and a wind-up side friction member which are integrally rotated with the wind-up side winding core, a transmission member which is rotatable with respect to the wind-up side rotation shaft and is held by the wind-up side rotation shaft and connected with the feed roller drive mechanism to transmit power of the feed roller drive mechanism to the wind-up side winding core, and a wind-up side friction urging member which urges the wind-up side friction member toward the transmission member. In addition, the release paper feed roller and the wind-up side winding core are driven so that a circumferential speed of the wind-up side winding core is faster than a circumferential speed of the release paper feed roller, and the wind-up side friction member is urged toward the transmission member by the wind-up side friction urging member so that, when a tensile force of the release paper between the release paper feed roller and the wind-up side winding core is less than a predetermined magnitude, the wind-up side winding core is integrally rotated with the transmission member and, when a tensile force of the release paper between the release paper feed roller and the wind-up side winding core is not less than the predetermined magnitude, slip occurs between the transmission member and the wind-up side friction member.

According to this structure, the release paper is wound up in the release paper collecting part without generating an excessive tensile force in the release paper and without loosening the release paper. In a case that a tip end of an adhesive label temporarily adhered on the release paper has passed through a predetermined reference position, if the wind-up side winding core is structured to be capable of being rotated in a reverse direction for aligning the tip end of the adhesive label with the reference position, the mechanism for rotating the wind-up side winding core in a reverse direction becomes complicated. However, according to at least an embodiment of the present invention, in a case that a tip end of an adhesive label temporarily adhered on the release paper has passed through a predetermined reference position, the wind-up side winding core is not required to be rotated in a reverse direction and a tip end of an adhesive label can be aligned with the reference position without peeling an adhesive label from the release paper and thus an above-mentioned complicated mechanism is not required.

As described above, in the label sticking apparatus in accordance with the at least an embodiment of present invention, in a case that a tip end of an adhesive label which is temporarily adhered to the release paper has passed through the reference position, the release paper feed mechanism is not required to be reversed and a tip end of an adhesive label can be aligned with the reference position without peeling an adhesive label from the release paper.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 14(A) is a view showing a state before a sticking operation of an adhesive label is started, FIG. 14(B) is a view showing a state that a tip end side of an adhesive label is peeled from a release paper, and FIG. 14(C) is a view showing a state that an adhesive label is pressed against a card by a pressing roller.

DESCRIPTION OF EMBODIMENTS

At least an embodiment of the present invention will be described below with reference to the accompanying drawings.

(Schematic Structure of Label Sticking Apparatus)

Figure 1:
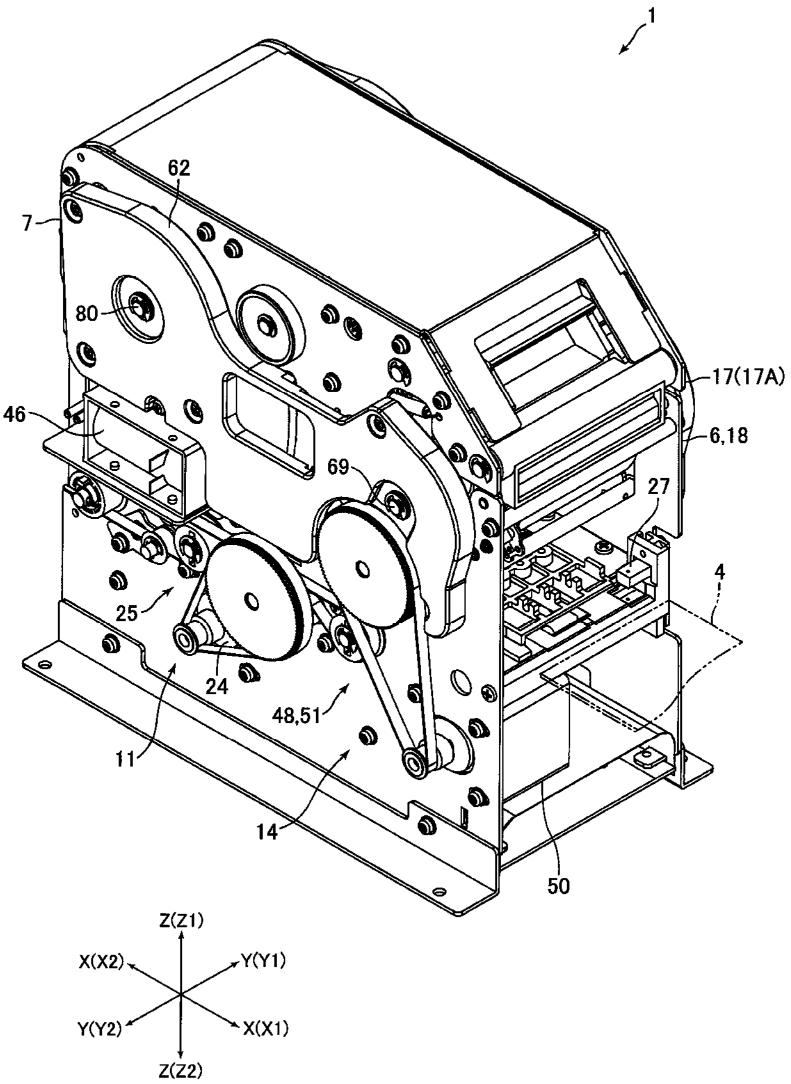
FIG. 1 is a perspective view showing a label sticking apparatus in accordance with an embodiment of the present invention.
Figure 2:
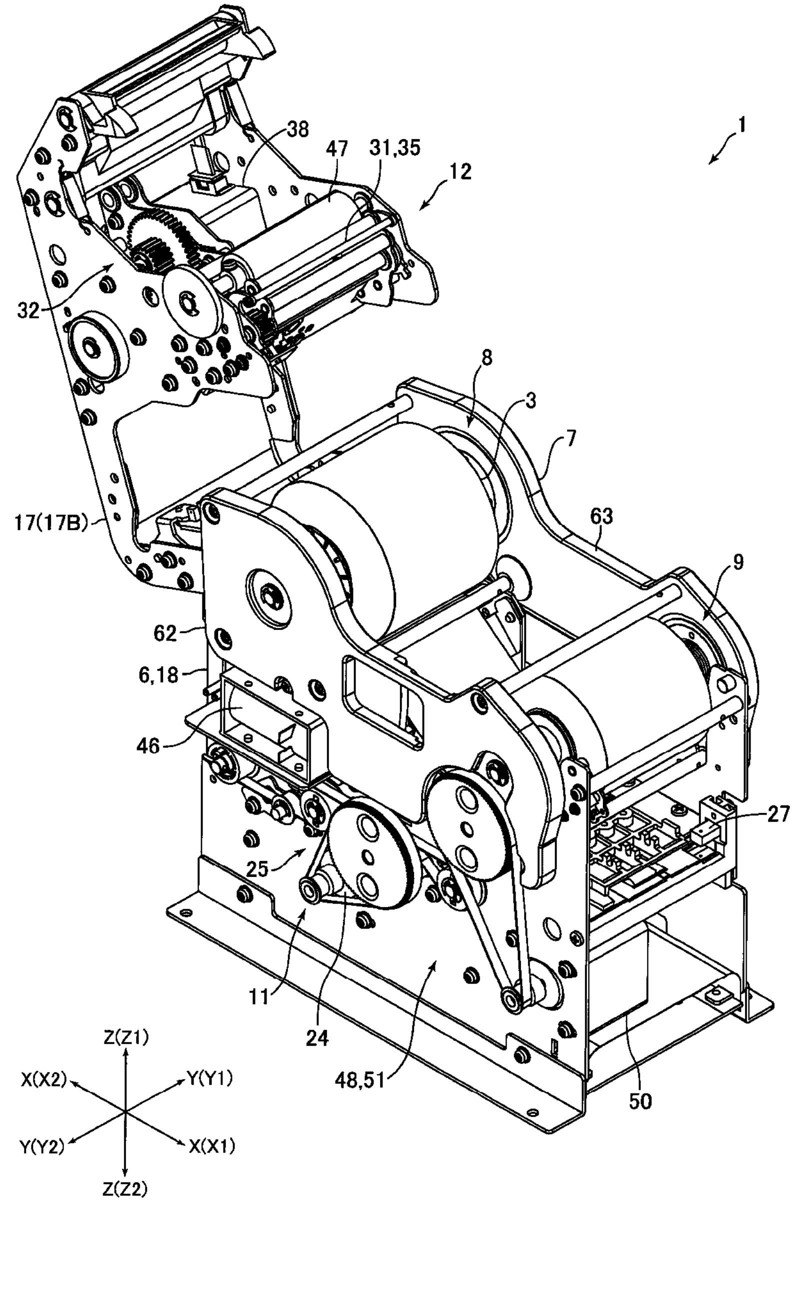
FIG. 2 is a perspective view showing a state that an upper frame part of the label sticking apparatus is opened in FIG. 1.
Figure 3:
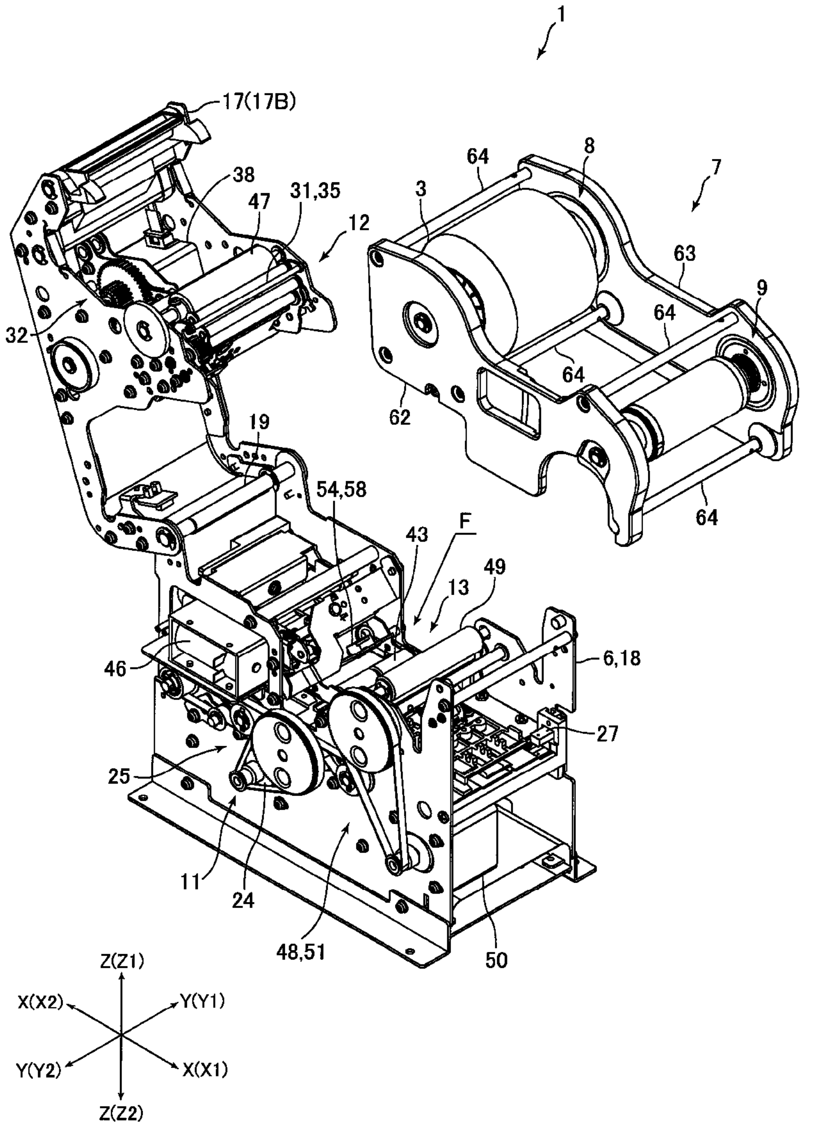
FIG. 3 is a perspective view showing a state that a label cartridge of the label sticking apparatus is detached in FIG. 1.
Figure 4:
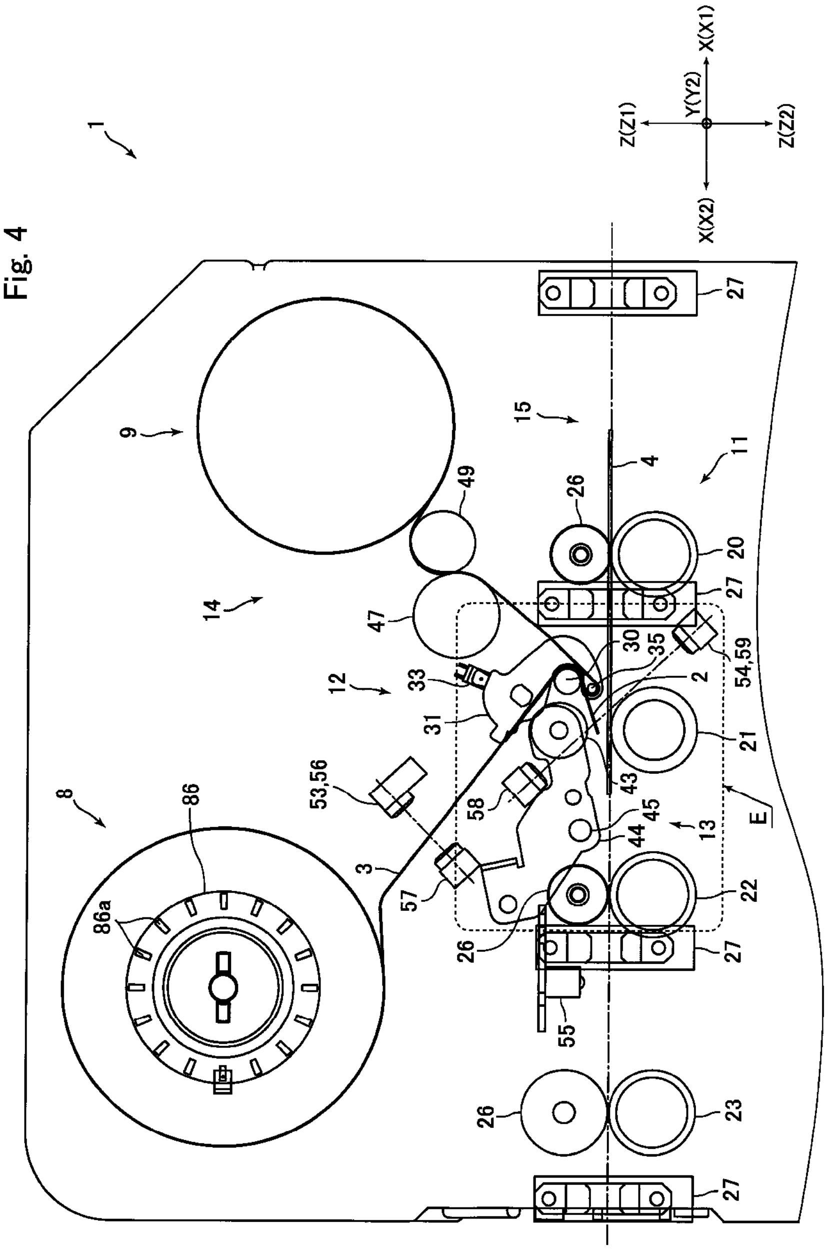
FIG. 4 is an explanatory side view showing a schematic internal structure of the label sticking apparatus shown in FIG. 1.
Figure 5:
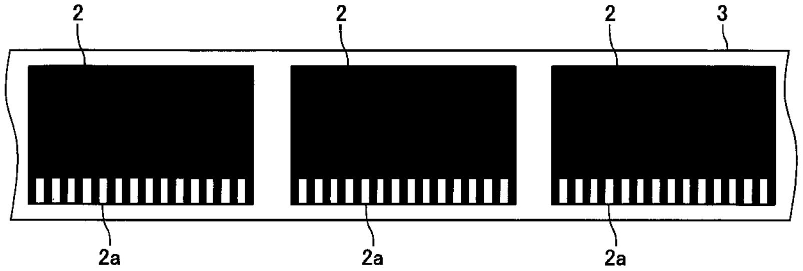
FIG. 5 is a plan view showing a state that adhesive labels are temporarily adhered on a release paper which is used in the label sticking apparatus shown in FIG. 1.

FIG. 1 is a perspective view showing a label sticking apparatus 1 in accordance with an embodiment of the present invention. FIG. 2 is a perspective view showing a state that an upper frame part 17 of the label sticking apparatus 1 is opened in FIG. 1. FIG. 3 is a perspective view showing a state that a label cartridge 7 of the label sticking apparatus 1 is detached in FIG. 1. FIG. 4 is an explanatory side view showing a schematic internal structure of the label sticking apparatus 1 shown in FIG. 1. FIG. 5 is a plan view showing a state that adhesive labels 2 are temporarily adhered on a release paper 3 which is used in the label sticking apparatus 1 shown in FIG. 1.

In the following descriptions, three directions perpendicular to each other are referred to as an "X" direction, a "Y" direction and a "Z" direction, and the "X" direction is a "front and rear direction", the "Y" direction is a "right and left direction" and the "Z" direction is an "upper and lower direction". Further, an "X1" direction side in FIG. 1 is referred to as a "front" side, an "X2" direction side is referred to as a "rear" side, a "Y1" direction side as a "right" side, a "Y2" direction side as a "left" side, a "Z1" direction side as an "upper" side, and a "Z2" direction side as a "lower" side. In addition, a rotating direction in a clockwise direction in FIG. 4 is referred to as a "clockwise direction" and a rotating direction in a counterclockwise direction is referred to as a "counterclockwise direction". In addition, the front and rear direction is a feeding direction of a card 4 in the label sticking apparatus 1, the right and left direction is a widthwise direction of a card 4 in the inside of the label sticking apparatus 1, and the upper and lower direction is a thickness direction of a card 4 in the inside of the label sticking apparatus 1.

The label sticking apparatus 1 in this embodiment is an apparatus in which an adhesive label 2 is peeled from a belt-shaped release paper 3 (see FIG. 5) on which a plurality of adhesive labels 2 is temporarily adhered at a constant interval to be stuck on a card 4 which is an adhered medium. The label sticking apparatus 1 is, as shown in FIGS. 1 through 3, structured of a main body part 6 and a label cartridge 7 which is capable of being attached to and detached from the main body part 6. The label cartridge 7 is provided with a release paper supply part 8 around which a release paper 3 before adhesive labels 2 are peeled is wound and held, and a release paper collecting part 9 around which the release paper 3 after the adhesive labels 2 have been peeled is wound and held.

Further, the label sticking apparatus 1 includes a card feeding mechanism 11 for feeding a card 4 in an inside of the apparatus, a label peeling mechanism 12 by which a release paper 3 is bent between the release paper supply part 8 and the release paper collecting part 9 to peel an adhesive label 2 from the release paper 3, a label pressing mechanism 13 which presses the adhesive label 2 peeled by the label peeling mechanism 12 against a card 4, and a release paper feed mechanism 14 which feeds the release paper 3 from the release paper supply part 8 to the release paper collecting part 9. A card feeding passage 15 as a medium feeding passage through which a card 4 is fed is formed in an inside of the label sticking apparatus 1.

An adhesive label 2 is formed of material having light blocking effect which does not transmit light and is formed in a substantially rectangular shape. An adhesive face of an adhesive label 2 (rear face of an adhesive label 2 in FIG. 5) is temporarily adhered to a release paper 3 in order to maintain its adhesive performance. In this embodiment, as shown in FIG. 5, the color of a counter-adhesive face (front face of the adhesive label 2 in FIG. 5) which is a face on an opposite side to the adhesive face of the adhesive label 2 is black. Further, in this embodiment, a bar-code pattern 2*a* in a bar-code shape is printed on the counter-adhesive face of the adhesive label 2. A bar-code pattern 2*a* is, for example, formed so that a white bar and a black bar whose widths are constant are arranged alternately. A white bar and a black bar are arranged in a longitudinal direction of the release paper 3.

A release paper 3 is formed of light transmissive material which transmits light. Adhesive labels 2 are temporarily adhered on one face of the release paper 3. In this embodiment, a face of the release paper 3 on a side where adhesive labels 2 are temporarily adhered is a front face of the release paper 3, and a face of the release paper 3 where the adhesive labels 2 are not temporarily adhered is a rear face of the release paper 3.

A card 4 is, for example, a card made of vinyl chloride whose thickness is about 0.7-0.8 mm. Predetermined character information is printed on the card 4. In this embodiment, when an adhesive label 2 is stuck on the card 4 in the inside of the label sticking apparatus 1, the character information is covered by the adhesive label 2. The adhesive label 2 is stuck on the card 4 so that an arrangement direction of a white bar and a black bar which structure a bar-code pattern 2*a* and the longitudinal direction of the card 4 are substantially coincided with each other. Further, the card 4 is, for example, formed with a magnetic stripe in which magnetic information is recorded. In accordance with an embodiment of the present invention, the card 4 may be fixed with IC contacts and an antenna for communication may be incorporated into the card 4. Further, the card 4 may be a PET (polyethylene terephthalate) card whose thickness is about 0.18-0.36 mm or may be a paper card having a predetermined thickness.

A main body part 6 is structured of an upper frame part 17 which structures an upper face portion of the main body part 6 and a lower main body part 18 which structures a principal portion of the main body part 6 other than the upper frame part 17. A shaft 19 (see FIG. 3) is attached to a back side end of the upper frame part 17, and the upper frame part 17 is held by the lower main body part 18 so as to be capable of turning with respect to the lower main body part 18 with the shaft 19 as a turning center.

In this embodiment, when the upper frame part 17 is turned in a clockwise direction with the shaft 19 as a center in a state that a label cartridge 7 is placed on the lower main body part 18 (state shown in FIG. 2), the upper frame part 17 is locked to the lower main body part 18 by a lock mechanism which is disposed at a front side end of the upper frame part 17. As a result, as shown in FIG. 1, the label cartridge 7 is fixed to the main body part 6 in a state that the label cartridge 7 is sandwiched between the upper frame part 17 and the lower main body part 18. Further, when the upper frame part 17 is turned in a counterclockwise direction from a state shown in FIG. 1, as shown in FIG. 2, an upper side of the label cartridge 7 is opened and the label cartridge 7 placed on the lower main body part 18 can be taken out toward an upper side as shown in FIG. 3. In other words, in this embodiment, the upper frame part 17 is turnable with respect to the lower main body part 18 between a closed position 17A (see FIG. 1) where the label cartridge 7 is sandwiched and fixed between the upper frame part 17 and the lower main body part 18, and an open position 17B (see FIGS. 2 and 3) where an upper side of the label cartridge 7 is opened and the label cartridge 7 can be taken out toward an upper side.

A card feeding passage 15 is formed in a straight line shape in the front and rear direction of the label sticking apparatus 1 so as to penetrate through the label sticking apparatus 1 in the front and rear direction. Further, the card feeding passage 15 is formed in the inside of the lower main body part 18. In this embodiment, a card 4 is fed from the front side to the rear side.

A card feeding mechanism 11 includes a plurality of drive rollers 20 through 23, a motor 24 for driving the drive rollers 20 through 23, and a power transmission mechanism 25 which transmits power of the motor 24 to the drive rollers 20 through 23. The drive rollers 20 through 23 are disposed on a lower side with respect to the card feeding passage 15 at a predetermined interval. Further, the drive rollers 20 through 23 are disposed from the front side toward the rear side in this order. Pad rollers 26 which are urged toward the drive rollers 20, 22 and 23 are disposed on upper sides of the drive rollers 20, 22 and 23. The motor 24 is, for example, a stepping motor. The power transmission mechanism 25 is structured of a plurality of pulleys, a timing belt and the like.

A plurality of card detection mechanisms 27 for detecting a card 4 is disposed in the card feeding passage 15. Specifically, four card detection mechanisms 27 are disposed at a front end and a rear end of the card feeding passage 15, a rear side with respect to the drive roller 20, and a rear side with respect to the drive roller 22. The card detection mechanism 27 is an optical type sensor provided with a light emitting element and a light receiving element.

(Structure of Label Peeling Mechanism)

Figure 6:
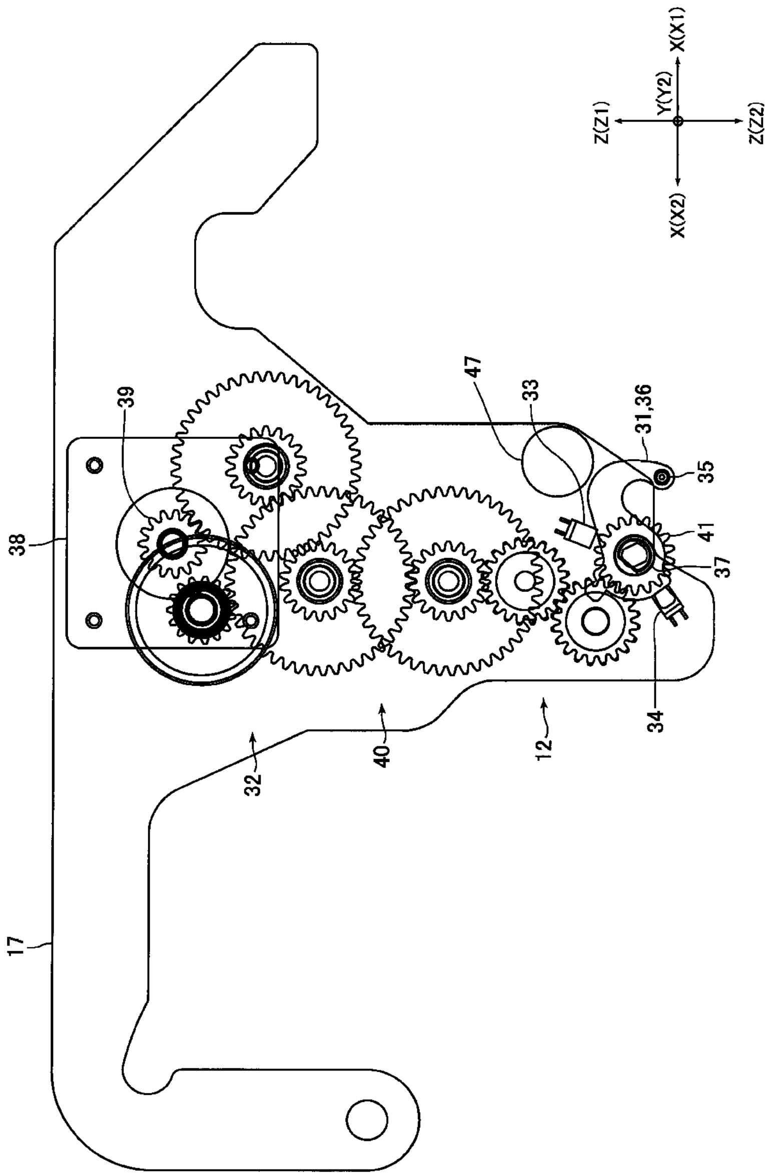
FIG. 6 is an explanatory side view showing a schematic structure of a movable member and a drive mechanism for the movable member shown in FIG. 4.

FIG. 6 is an explanatory side view showing a schematic structure of a movable member 31 and a drive mechanism 32 for the movable member 31 shown in FIG. 4.

Figure 7:
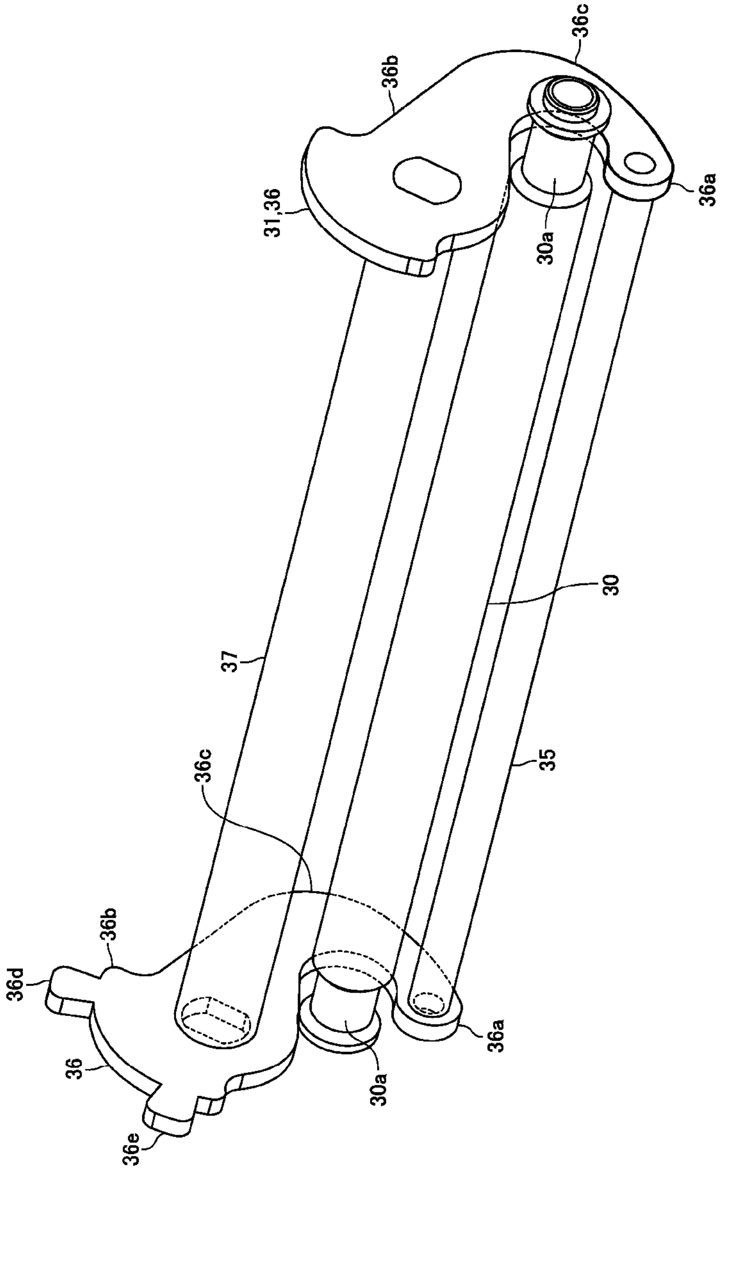
FIG. 7 is a perspective view showing the movable member and a fixed shaft shown in FIG. 4.
Figure 8:
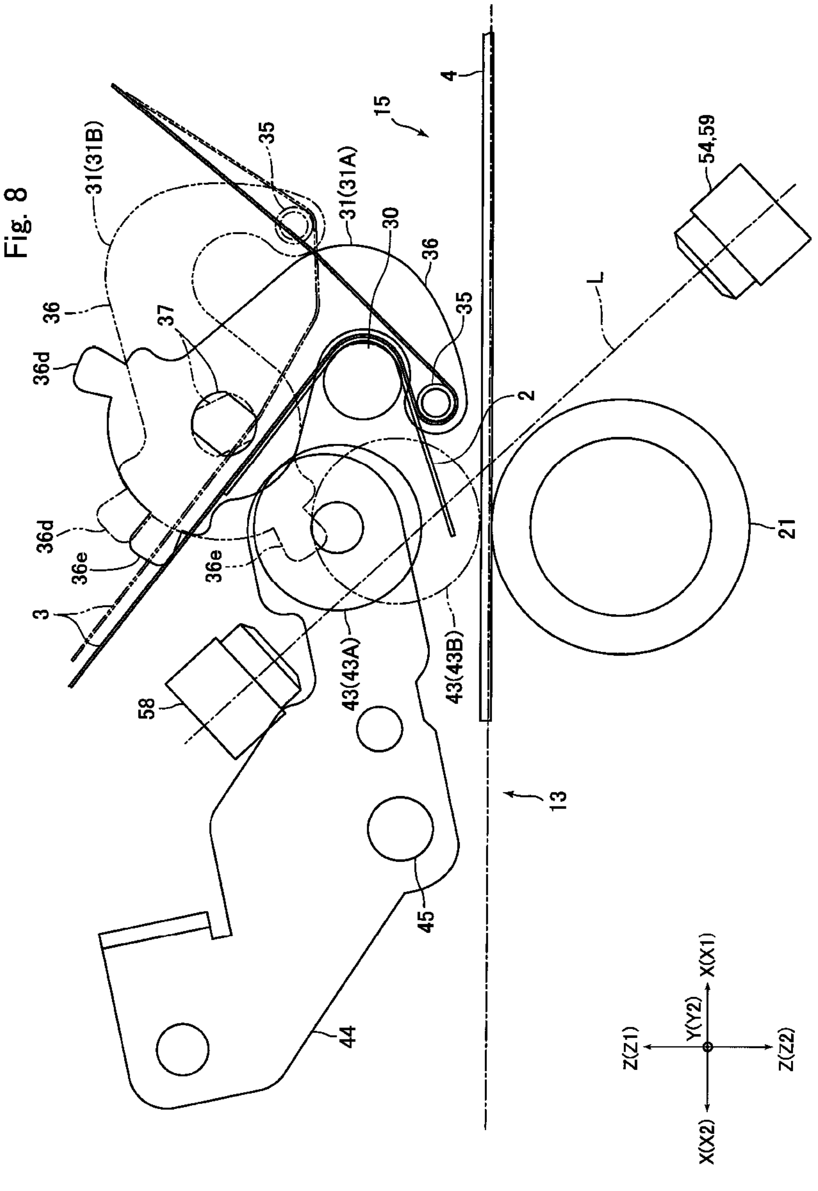
FIG. 8 is an enlarged view showing the "E" part in FIG. 4.
Figure 9:
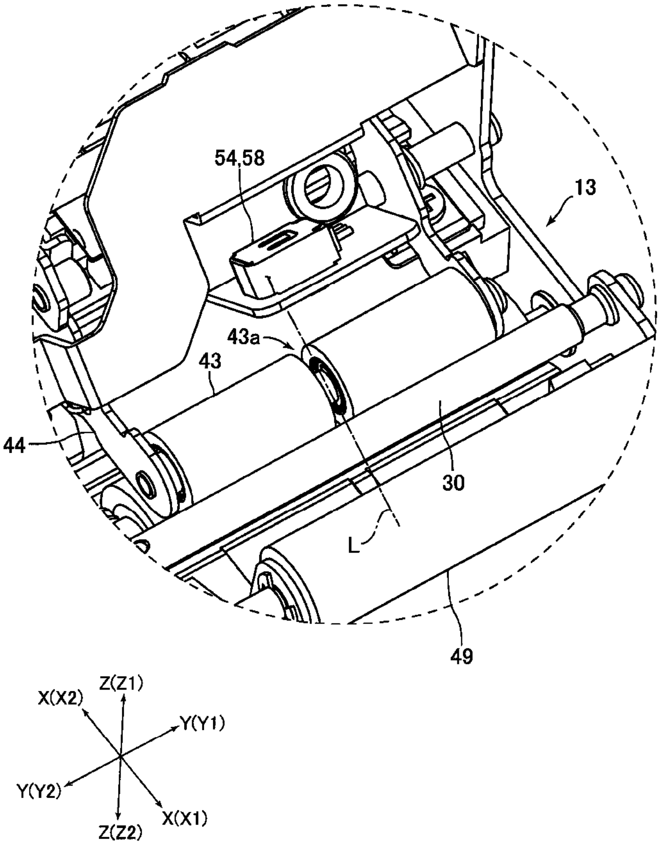
FIG. 9 is an enlarged perspective view showing the "F" part in FIG. 3 which is viewed from another angle.

FIG. 7 is a perspective view showing the movable member 31 and a fixed shaft 30 shown in FIG. 4. FIG. 8 is an enlarged view showing the "E" part in FIG. 4. FIG. 9 is an enlarged perspective view showing the "F" part in FIG. 3 which is viewed from another angle.

The label peeling mechanism 12 includes a fixed shaft 30 which is fixed to the lower main body part 18, a movable member 31 which is turnably held by the upper frame part 17, and a drive mechanism 32 which is structured to turn the movable member 31. The fixed shaft 30 and the movable member 31 is disposed between the release paper supply part 8 and the release paper collecting part 9 in the front and rear direction. Further, the fixed shaft 30 and the movable member 31 are disposed on a lower side with respect to the release paper supply part 8 and the release paper collecting part 9 and are disposed on an upper side with respect to the card feeding passage 15. Further, the label peeling mechanism 12 includes two movable member detection mechanisms 33 and 34 for detecting a position of the movable member 31 (see FIG. 6). The movable member detection mechanisms 33 and 34 are an optical type sensor provided with a light emitting element and a light receiving element.

The fixed shaft 30 is formed in a substantially long and thin cylindrical shape and is fixed to the lower main body part 18 with the right and left direction as an axial direction. The fixed shaft 30 is, as shown in FIG. 4, disposed on a front upper side with respect to the drive roller 21. Further, the fixed shaft 30 is disposed on a passing route of a release paper 3 from the release paper supply part 8 to the release paper collecting part 9. A small diameter part 30*a* whose outer diameter is smaller than the other portion is formed on each of both end sides of the fixed shaft 30 as shown in FIG. 7.

The movable member 31 is provided with a shaft member 35 in a long and thin cylindrical shape which is abutted with the release paper 3, two shaft holding members 36 which respectively hold both end sides of the shaft member 35, and a transmission shaft member 37 which connects two shaft holding members 36 with each other and transmits power of the drive mechanism 32 to the shaft holding member 36. The movable member 31 is turnable between a bending position 31A (position as shown by the solid line in FIG. 8) where a release paper 3 is bent so that an adhesive label 2 is peeled from the release paper 3 and a bending relaxing position 31 B (position as shown by the two-dot chain line in FIG. 8) where a bending state of the release paper 3 is relaxed so that an adhesive label 2 is not peeled from the release paper 3 with the transmission shaft member 37 as a turning center.

The shaft member 35 is disposed with the right and left direction as its axial direction. A diameter of the shaft member 35 is smaller than a diameter of the fixed shaft 30. Further, the transmission shaft member 37 is disposed on an upper side with respect to the fixed shaft 30 with the right and left direction as its axial direction.

The shaft holding member 36 is formed in a flat plate shape. The shaft holding member 36 is formed in a bent hook shape so as to prevent interference with the fixed shaft 30 when the movable member 31 is turned from the bending relaxing position 31B to the bending position 31A. Specifically, as shown in FIG. 7, the shaft holding member 36 is formed in a hook shape which is structured of a first fixing part 36*a* to which the shaft member 35 is fixed, a second fixing part 36*b* to which the transmission shaft member 37 is fixed, and a curved part 36*c* in a substantially semicircular arc shape which connects the first fixing part 36*a* with the second fixing part 36*b*. The shaft holding member 36 is disposed so as to correspond to the position where the small diameter part 30*a* is formed in the right and left direction and, when the movable member 31 is located at the bending position 31A, an inner side face of the curved part 36*c* faces an outer peripheral face of the small diameter part 30*a* through a predetermined gap space.

The second fixing part 36*b* of at least one of two shaft holding members 36 is formed with light intercepting parts 36*d* and 36*e* for intercepting spaces between the light emitting elements and the light receiving elements of the movable member detection mechanisms 33 and 34. In this embodiment, when the space between the light emitting element and the light receiving element of the movable member detection mechanism 33 is intercepted by the light intercepting part 36*d*, it is detected that the movable member 31 is located at the bending position 31A. Further, when the space between the light emitting element and the light receiving element of the movable member detection mechanism 34 is intercepted by the light intercepting part 36*e*, it is detected that the movable member 31 is located at the bending relaxing position 31B.

The drive mechanism 32 is attached to the upper frame part 17. The drive mechanism 32 includes, as shown in FIG. 6, a drive motor 38, a gear 39 fixed to a rotation shaft of the motor 38, and a gear train 40 by which power of the motor 38 is decelerated to transmit the power to the movable member 31. The motor 38 is, for example, a stepping motor. A last gear 41 of the gear train 40 is fixed to the transmission shaft member 37.

In the label peeling mechanism 12, when the motor 38 is driven, the movable member 31 is turned between the bending position 31A and the bending relaxing position 31B with the transmission shaft member 37 as a turning center. When the movable member 31 is located at the bending position 31A, the fixed shaft 30 abuts with the front face of the release paper 3 (face on which the adhesive label 2 is temporarily adhered) and the shaft member 35 abuts with the rear face of the release paper 3. Further, when the movable member 31 is located at the bending position 31A, the shaft member 35 is disposed on an under side of the fixed shaft 30 and on an upper side of the card feeding passage 15 and the release paper 3 is bent so as to be turned around by the shaft member 35 of the movable member 31 and the fixed shaft 30. Therefore, when the release paper 3 is fed from the release paper supply part 8 to the release paper collecting part 9 in a case that the movable member 31 is located at the bending position 31A, an adhesive label 2 is peeled from the release paper 3.

On the other hand, when the movable member 31 is located at the bending relaxing position 31B, the fixed shaft 30 is separated from the front face of the release paper 3. Further, when the movable member 31 is located at the bending relaxing position 31B, the shaft member 35 is disposed on a front upper side of the fixed shaft 30 and the bending state of the release paper 3 is relaxed. Therefore, even in a case that the release paper 3 is fed from the release paper supply part 8 to the release paper collecting part 9 when the movable member 31 is located at the bending relaxing position 31B, an adhesive label 2 is not peeled from the release paper 3.

(Structure of Label Pressing Mechanism)

The label pressing mechanism 13 includes a pressing roller 43 which is capable of abutting with a counter-adhesive face of the adhesive label 2, a roller holding member 44 which rotatably holds the pressing roller 43, a fixed shaft 45 which turnably supports the roller holding member 44, and a solenoid 46 (see FIG. 1 and the like) which is a drive source for turning the roller holding member 44 around the fixed shaft 45.

The pressing roller 43 is disposed on an upper side with respect to the drive roller 21. The pressing roller 43 is formed with a groove part 43*a* through which light is passed from a light emitting element toward a light receiving element structuring a label tip end detection mechanism 54 described below so as to recess to an inner side in the radial direction (see FIG. 9). The groove part 43*a* is formed at a substantially center position in an axial direction of the pressing roller 43. The fixed shaft 45 is fixed to the lower main body part 18 with the right and left direction as its axial direction. Further, the fixed shaft 45 is disposed between the drive roller 21 and the drive roller 22 in the front and rear direction and is disposed on an upper side with respect to the card feeding passage 15. The solenoid 46 is connected with the roller holding member 44 through a link mechanism.

In a state that an electric current is not supplied to the solenoid 46, the roller holding member 44 is turned in a counterclockwise direction around the fixed shaft 45 and the pressing roller 43 is separated from the drive roller 21. On the other hand, when the solenoid 46 is energized, the roller holding member 44 is turned in the clockwise direction and the pressing roller 43 approaches the drive roller 21. In this embodiment, when a tip end side of the adhesive label 2 peeled from the release paper 3 is disposed between the drive roller 21 and the pressing roller 43, the roller holding member 44 is turned in the clockwise direction and the pressing roller 43 abuts with the counter-adhesive face of the adhesive label 2 to press the adhesive label 2 against a card 4. Further, in this state, when the card 4 is fed to the rear side and the release paper 3 is fed from the release paper supply part 8 toward the release paper collecting part 9, the adhesive label 2 is stuck on the card 4.

In this embodiment, a position of the pressing roller 43 when an electric current is not supplied to the solenoid 46 is a retreated position 43A (position shown by the solid line in FIG. 8) where the pressing roller 43 is separated from the counter-adhesive face of an adhesive label 2. A position of the pressing roller 43 when an electric current is supplied to the solenoid 46 is a pressing position 43B (position shown by the two-dot chain line in FIG. 8) where the pressing roller 43 abuts with the counter-adhesive face of an adhesive label 2 to press the adhesive label 2 against a card 4. Further, in this embodiment, a pressing roller moving mechanism which moves the pressing roller 43 between the retreated position 43A and the pressing position 43B is structured of the solenoid 46, a link mechanism and the like.

(Structure of Release Paper Feed Mechanism)

A release paper feed mechanism 14 includes a release paper feed roller 47 which is abutted with the rear face of a release paper 3 to feed the release paper 3 and a feed roller drive mechanism 48 (see FIG. 1 and the like) which drives the release paper feed roller 47. The release paper feed roller 47 is disposed on an upper side with respect to the card feeding passage 15 and is disposed on a rear side to the release paper collecting part 9 and on a front side to the fixed shaft 30. Further, the release paper feed roller 47 is rotatably supported by the upper frame part 17. A pad roller 49 which is urged toward the release paper feed roller 47 is oppositely disposed to the release paper feed roller 47. The pad roller 49 is rotatably supported by the lower main body part 18.

The feed roller drive mechanism 48 includes a drive motor 50 and a power transmission mechanism 51 which transmits power of the motor 50 to the release paper feed roller 47 (see FIG. 1 and the like). The power transmission mechanism 51 is structured of a pulley, a timing belt, gears and the like, and the release paper feed roller 47 is connected with the motor 50 through the power transmission mechanism 51. Further, in this embodiment, as described below, the release paper collecting part 9 is connected with the motor 50 through the power transmission mechanism 51 and a wind-up side winding core 65 described below which structures the release paper collecting part 9 is rotated together with the release paper feed roller 47 by power of the motor 50. In other words, the wind-up side winding core 65 in this embodiment structures a part of the release paper feed mechanism 14.

(Structure of Label Position Detection Mechanism, Label Tip End Detection Mechanism and Label Sticking Detection Mechanism)

The label sticking apparatus 1 includes, as shown in FIG. 4, a label position detection mechanism 53 for detecting a tip end of an adhesive label 2 which is temporarily adhered on the release paper 3, a label tip end detection mechanism 54 for detecting a tip end of the adhesive label 2 which is peeled from the release paper 3 by the label peeling mechanism 12, and a label sticking detection mechanism 55 for detecting that the adhesive label 2 is stuck on a card 4.

The label position detection mechanism 53 is a transmission type optical sensor which is provided with a light emitting part 56 having a light emitting element and a light receiving part 57 having a light receiving element. The light emitting part 56 and the light receiving part 57 are oppositely disposed to each other so as to interpose the release paper 3 between the release paper supply part 8 and the movable member 31. In other words, the label position detection mechanism 53 is disposed so as to detect a tip end of an adhesive label 2 which is temporarily adhered on the release paper 3 between the release paper supply part 8 and the movable member 31. Further, as described above, the release paper 3 is formed of light transmissive material and the adhesive label 2 is formed of material having light blocking effect and thus, a tip end of an adhesive label 2 is detected by intercepting light from the light emitting part 56 toward the light receiving part 57 by the adhesive label 2.

In this embodiment, positioning of an adhesive label 2 which is temporarily adhered on the release paper 3 is performed by utilizing the label position detection mechanism 53. Specifically, when a head point of an adhesive label 2 is detected by the label position detection mechanism 53, a head point of one preceding adhesive label 2 is detected to be reached to a predetermined reference position and feeding of the release paper 3 by the release paper feed mechanism 14 is stopped and, in this manner, positioning of an adhesive label 2 which is temporarily adhered on the release paper 3 is performed.

The label tip end detection mechanism 54 is a transmission type optical sensor which is provided with a light emitting part 58 having a light emitting element and a light receiving part 59 having a light receiving element. The light emitting part 58 and the light receiving part 59 are oppositely disposed to each other so as to interpose an adhesive label 2 which is peeled from the release paper 3 and is located between the pressing roller 43 at the retreated position 43A and the drive roller 21. In other words, the light emitting element and the light receiving element which structure the label tip end detection mechanism 54 are disposed so as to interpose a tip end side of an adhesive label 2 which is peeled from the release paper 3 by the label peeling mechanism 12. Further, the light emitting part 58 and the light receiving part 59 are disposed so that light from the light emitting part 58 toward the light receiving part 59 passes through the groove part 43*a* of the pressing roller 43 located at the retreated position 43A. In other words, the light emitting part 58 and the light receiving part 59 are disposed so that their optical axes “L” (see FIGS. 8 and 9) pass through the groove part 43*a* of the pressing roller 43. As described above, an adhesive label 2 is formed of material having light blocking effect and thus, when light from the light emitting part 56 toward the light receiving part 57 is intercepted by the adhesive label 2, a tip end of the adhesive label 2 is detected.

In this embodiment, a tip end of an adhesive label 2 is detected by the label tip end detection mechanism 54 and thereby alignment of the adhesive label 2 which is to be stuck on a card 4 is completed. Further, a tip end of an adhesive label 2 is detected by the label tip end detection mechanism 54 and thereby it is detected that the adhesive label 2 is capable of being pressed against a card 4 by the pressing roller 43.

The label sticking detection mechanism 55 is a reflection type optical sensor having a light emitting element and a light receiving element. The label sticking detection mechanism 55 is disposed between the drive roller 22 and the drive roller 23 in the front and rear direction and is disposed on an upper side with respect to the card feeding passage 15. Further, the label sticking detection mechanism 55 is disposed at a position corresponding to a bar-code pattern 2*a* of an adhesive label 2 which is stuck on a card 4 in the right and left direction. In this embodiment, the label sticking detection mechanism 55 detects the bar-code pattern 2*a* and thereby it is detected that an adhesive label 2 has been stuck on a card 4.

(Structure of Label Cartridge)

Figure 10:
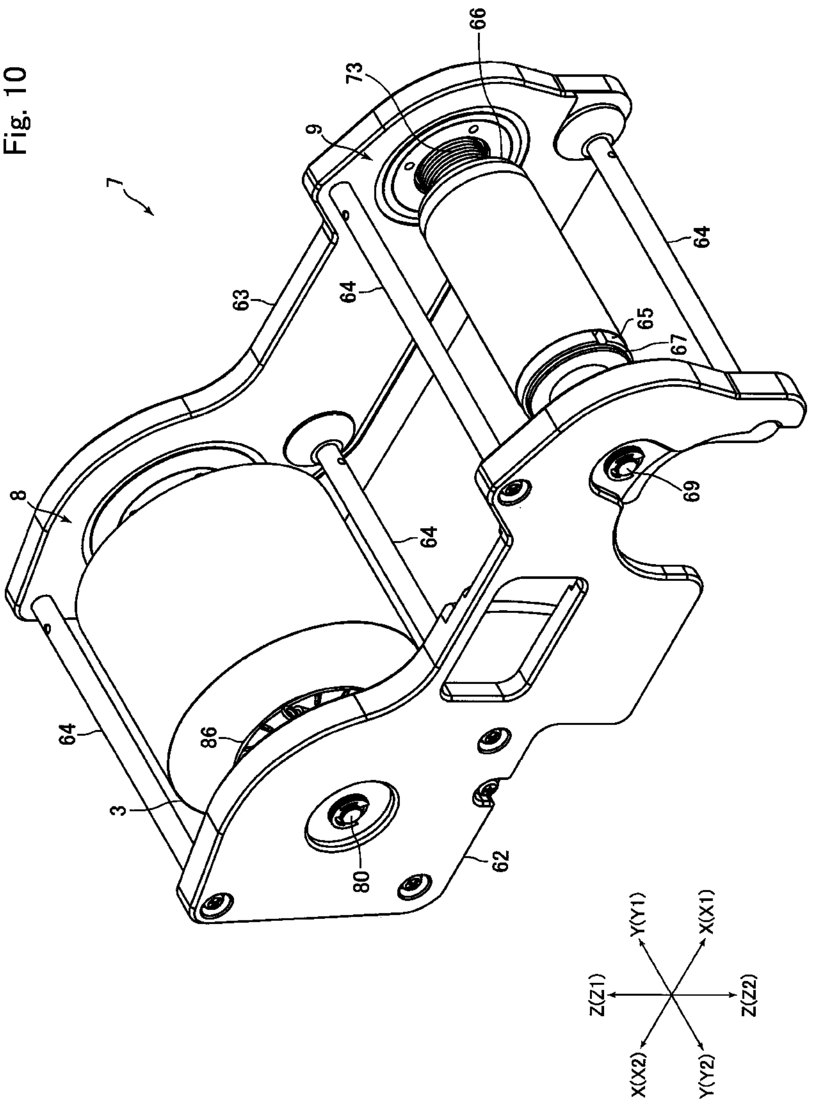
FIG. 10 is a perspective view showing a label cartridge shown in FIG. 1.
Figure 11:
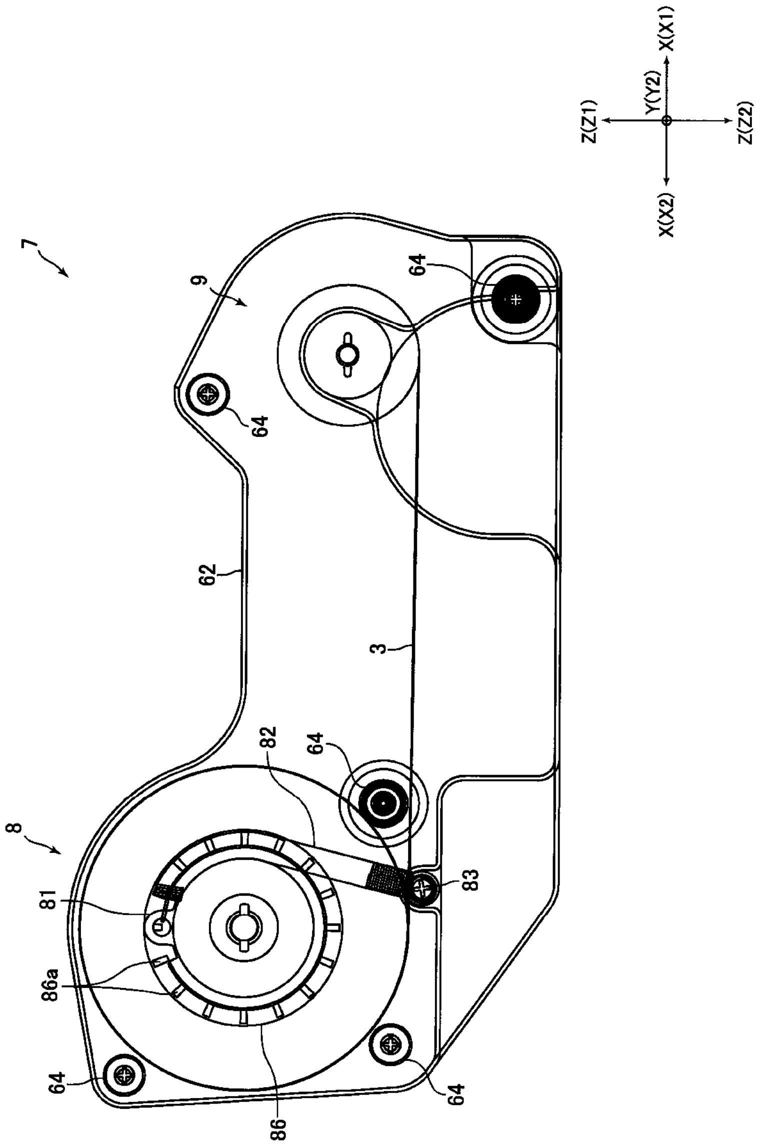
FIG. 11 is an explanatory side view showing a structure of the label cartridge in FIG. 10.
Figure 12:
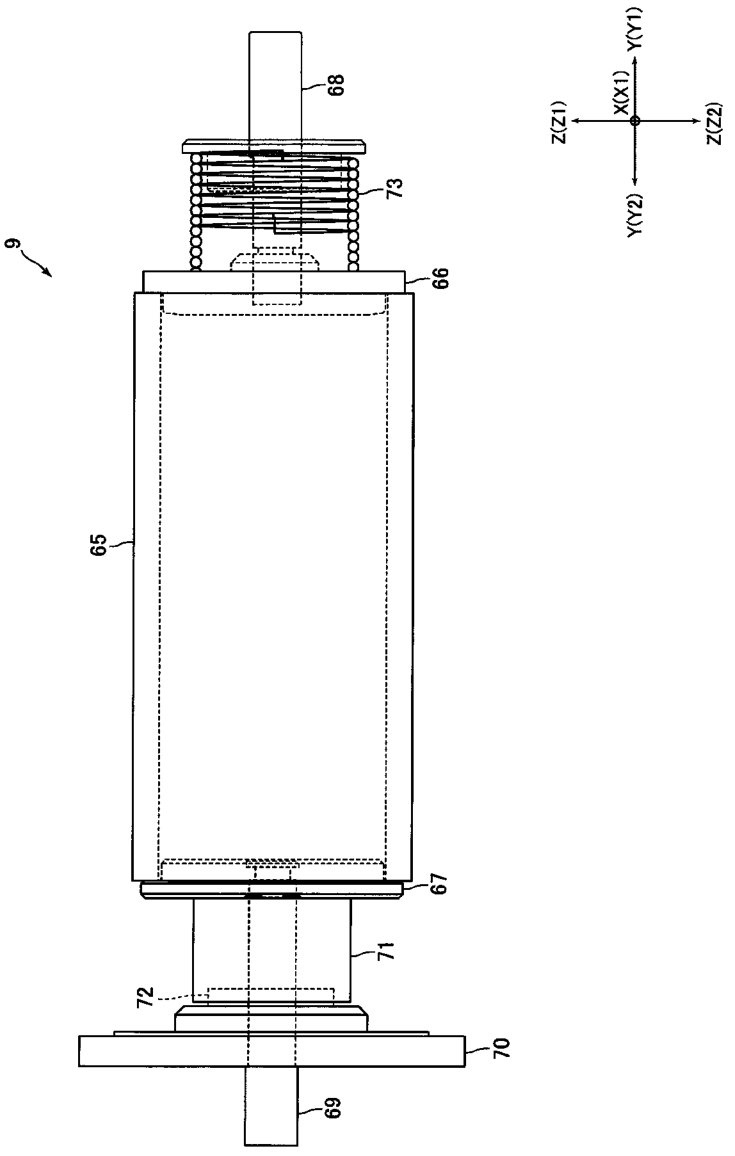
FIG. 12 is an explanatory plan view showing a structure of a release paper collecting part in FIG. 10.
Figure 13:
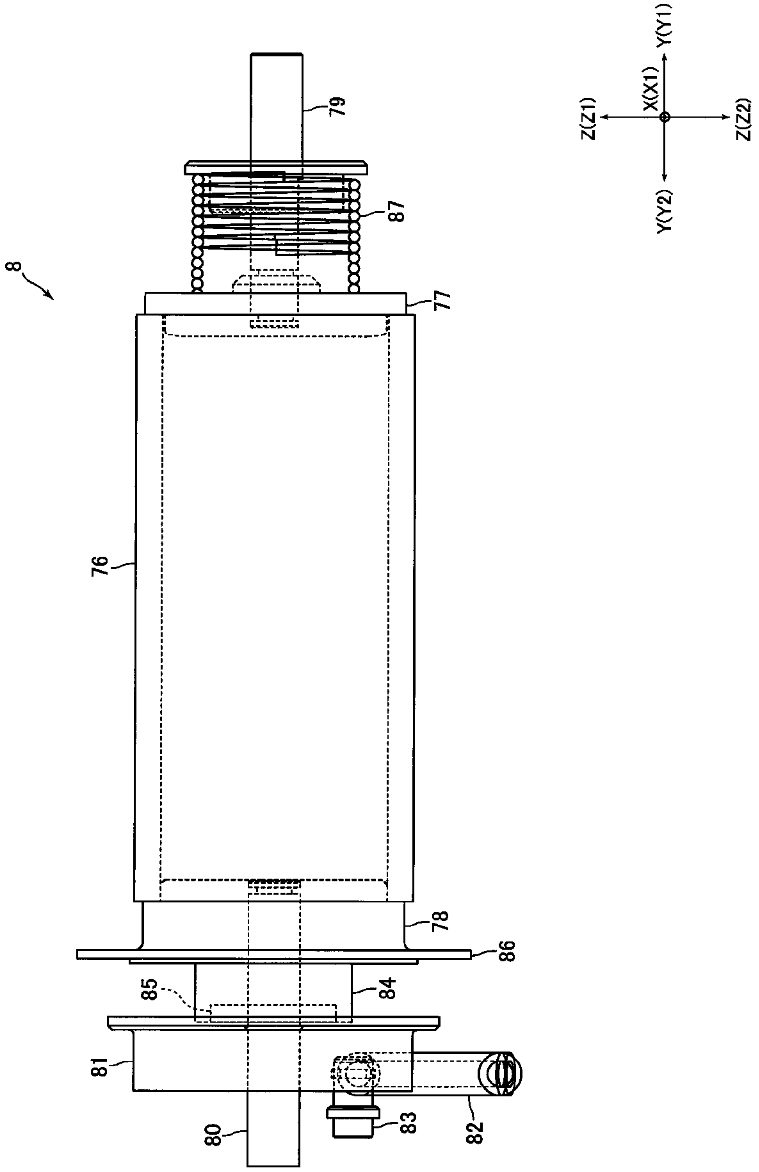
FIG. 13 is an explanatory plan view showing a structure of a release paper supply part in FIG. 10.

FIG. 10 is a perspective view showing a label cartridge 7 shown in FIG. 1. FIG. 11 is an explanatory side view showing a structure of the label cartridge 7 in FIG. 10. FIG. 12 is an explanatory plan view showing a structure of the release paper collecting part 9 in FIG. 10. FIG. 13 is an explanatory plan view showing a structure of the release paper supply part 8 in FIG. 10.

A label cartridge 7 is, as described above, attached with the release paper supply part 8 and the release paper collecting part 9. In this embodiment, the release paper supply part 8 is disposed on a rear side and the release paper collecting part 9 is disposed on a front side. Further, the label cartridge 7 includes two cartridge frames 62 and 63, which are oppositely disposed and parallel to each other with a predetermined distance therebetween, and a plurality of connecting shafts 64 which connect two cartridge frames 62 and 63 with each other. The cartridge frame 62 structures a left side face of the label cartridge 7 and the cartridge frame 63 structures a right side face of the label cartridge 7.

The release paper collecting part 9 is, as shown in FIG. 12, provided with a wind-up side winding core 65 in a cylindrical tube shape by which the release paper 3 is wound up, an attaching plate 66 which is attached to a right end of the wind-up side winding core 65, and an attaching plate 67 which is attached to a left end of the wind-up side winding core 65. The attaching plate 66 is rotatably supported by a fixed shaft 68 which is fixed to the cartridge frame 63. On the other hand, the attaching plate 67 is attached with a wind-up side rotation shaft 69 which is rotatably supported by the cartridge frame 62 and the wind-up side rotation shaft 69 is integrally rotated with the wind-up side winding core 65 and the attaching plates 66 and 67.

A left end side of the wind-up side rotation shaft 69 is inserted into a gear 70 as a transmission member which is connected with the feed roller drive mechanism 48 and the gear 70 is rotatably held by the wind-up side rotation shaft 69. A holding member 71 is disposed between the attaching plate 67 and the gear 70. A right end face of the holding member 71 is formed with an engagement part which is engaged with the attaching plate 67 in a rotating direction of the wind-up side winding core 65, and the holding member 71 is integrally rotated with the wind-up side winding core 65, the attaching plate 67 and the like. Further, a left end face of the holding member 71 is fixed with a wind-up side friction member 72 such as felt which is formed of material having a comparatively large friction coefficient. A left end face of the wind-up side friction member 72 abuts with a right end face of the gear 70.

A compression coil spring 73 as a wind-up side friction urging member which urges the attaching plate 66 to the left direction is disposed between the attaching plate 66 and the cartridge frame 63. The compression coil spring 73 urges the wind-up side friction member 72 toward the gear 70 through the wind-up side winding core 65, the attaching plates 66 and 67 and the holding member 71.

As described above, the gear 70 is connected with the feed roller drive mechanism 48 and power of the motor 50 is transmitted to the gear 70 through the power transmission mechanism 51. Further, the power transmitted to the gear 70 is transmitted to the wind-up side winding core 65 by a frictional force between the wind-up side friction member 72 urged by the compression coil spring 73 and the gear 70 through the holding member 71 to which the wind-up side friction member 72 is fixed and the attaching plate 67. Further, the wind-up side winding core 65 to which the power of the motor 50 is transmitted is rotated in the counterclockwise direction to wind up the release paper 3.

In this embodiment, the release paper feed roller 47 and the wind-up side winding core 65 are driven so that a circumferential speed of the wind-up side winding core 65 is faster than a circumferential speed of the release paper feed roller 47. In other words, an outer diameter of the release paper feed roller 47, an outer diameter of the wind-up side winding core 65, a reduction gear ratio of the feed roller drive mechanism 48 and the like are set so that a circumferential speed of the wind-up side winding core 65 is faster than a circumferential speed of the release paper feed roller 47.

Further, in this embodiment, an urging force of the compression coil spring 73, a friction coefficient between the gear 70 and the wind-up side friction member 72 and the like are set so that, when a tensile force of the release paper 3 between the release paper feed roller 47 and the wind-up side winding core 65 is less than a predetermined magnitude, the wind-up side friction member 72 and the gear 70 are frictionally engaged with each other and the gear 70 and the wind-up side winding core 65 are integrally rotated with each other and that, when the tensile force of the release paper 3 between the release paper feed roller 47 and the wind-up side winding core 65 is not less than the predetermined magnitude, slip occurs between the gear 70 and the wind-up side friction member 72.

The release paper supply part 8 is, as shown in FIG. 13, provided with a supply side winding core 76 in a cylindrical tube shape around which a release paper 3 to be supplied is wound, an attaching plate 77 which is attached to the right end of the supply side winding core 76, and an attaching member 78 which is attached to the left end of the supply side winding core 76. The attaching plate 77 is rotatably supported by a fixed shaft 79 which is fixed to the cartridge frame 63. On the other hand, the attaching member 78 is attached with a supply side rotation shaft 80 which is rotatably supported by the cartridge frame 62 and the supply side rotation shaft 80 is integrally rotated with the supply side winding core 76, the attaching plate 77 and the attaching member 78.

The left end side of the supply side rotation shaft 80 is inserted into the rotation member 81, and the rotation member 81 is rotatably held by the supply side rotation shaft 80. The rotation member 81 is attached with one end of a tension coil spring 82 as a rotation urging member which urges the rotation member 81. The other end of the tension coil spring 82 is attached to a fixed pin 83 which is fixed to the cartridge frame 62. The tension coil spring 82 in this embodiment urges the rotation member 81 in a counter-supply rotating direction (clockwise direction) opposite to a supply rotating direction (counterclockwise direction) which is a rotating direction of the supply side winding core 76 at the time of supplying of the release paper 3.

A rotation restricting mechanism (not shown) which restricts a turning range of the rotation member 81 is provided between the rotation member 81 and the cartridge frame 62. The rotation restricting mechanism is, for example, structured of a groove in a substantially circular arc shape, which is formed in the rotation member 81, and an engagement pin which is fixed to the cartridge frame 62 and is engaged with the groove.

A holding member 84 is disposed between the attaching member 78 and the rotation member 81. A right end face of the holding member 84 is formed with an engagement part which is engaged with an attaching member 78 in the rotating direction of the supply side winding core 76, and the holding member 84 is integrally rotated with the supply side winding core 76, the attaching member 78 and the like. Further, a left end face of the holding member 84 is fixed with a supply side friction member 85 such as felt which is formed of material having a comparatively large friction coefficient. A left end face of the supply side friction member 85 is abutted with a right end face of the rotation member 81. Further, the attaching member 78 is fixed with or integrally formed with a slit plate 86 in which a plurality of slit holes 86*a* (see FIG. 11) is formed at a constant interval in the circumferential direction. In this embodiment, it is detected by utilizing the slit plate 86*a* that a residual quantity of the release paper 3 which is wound around the supply side winding core 76 is small.

A compression coil spring 87 as a supply side friction urging member which urges the attaching plate 77 to the left direction is disposed between the attaching plate 77 and the cartridge frame 63. The compression coil spring 87 urges the supply side friction member 85 toward the rotation member 81 through the supply side winding core 76, the attaching plate 77, the attaching member 78 and the holding member 84.

In this embodiment, the supply side winding core 76 is rotated in the counterclockwise direction along with a feeding operation of the release paper 3 by the wind-up side winding core 65 and the release paper feed roller 47 at the time of supplying of the release paper 3. In other words, in this embodiment, the supply side winding core 76 is driven to be rotated along with a feeding operation of the release paper 3 and the release paper 3 is supplied.

Further, in this embodiment, an urging force of the compression coil spring 87, a friction coefficient between the rotation member 81 and the supply side friction member 85, an urging force of the tension coil spring 82 and the like are set so as to perform the following operation.

In a state that a label cartridge 7 is placed on the lower main body part 18, when the upper frame part 17 is turned in the clockwise direction to close the upper frame part 17, a release paper 3 is fed out by the movable member 31 and the like and the supply side winding core 76 is rotated in the counterclockwise direction. A rotating force of the supply side winding core 76 is transmitted to the rotation member 81 through the attaching member 78, the holding member 84 and the supply side friction member 85 and thus the rotation member 81 is turned in the counterclockwise direction together with the supply side winding core 76 and is stopped at a position after the rotation member 81 is turned. When the rotation member 81 is turned in the counterclockwise direction, an urging force in the clockwise direction is acted on the rotation member 81 by the tension coil spring 82 but the rotation member 81 is stopped at the position after being turned without returning in the clockwise direction.

In this state, when the release paper 3 is fed by the wind-up side winding core 65 and the release paper feed roller 47, the supply side winding core 76 begins to rotate in the counterclockwise direction along with a feeding operation of the release paper 3. When the supply side winding core 76 begins to rotate in the counterclockwise direction, a rotational force of the supply side winding core 76 is transmitted to the rotation member 81 through the attaching member 78, the holding member 84 and the supply side friction member 85, and the rotation member 81 is turned up to a rotation restriction position in the counterclockwise direction by the rotation restricting mechanism. After the rotation member 81 is turned up to the rotation restriction position in the counterclockwise direction, even when the supply side winding core 76 is rotated in the counterclockwise direction along with a feeding operation of the release paper 3, slip occurs between the supply side friction member 85 and the rotation member 81 and the rotation member 81 is not turned.

In a state that the rotation member 81 has been turned up to the rotation restriction position in the counterclockwise direction, an urging force to the clockwise direction by the tension coil spring 82 is acted on the rotation member 81. However, in this embodiment, when the rotation member 81 is turned up to the rotation restriction position in the counterclockwise direction, the rotation member 81 is stopped in this state. In other words, in this embodiment, when the rotation member 81 is turned up to the rotation restriction position in the counterclockwise direction, the rotation member 81 is stopped until the label cartridge 7 is detached from the main body part 6.

On the other hand, when the label cartridge 7 is detached from the main body part 6 at the time of a predetermined maintenance or the like, an urging force in the clockwise direction is acted on the rotation member 81 by the tension coil spring 82 and thus the rotation member 81 is turned in the clockwise direction. In this case, the rotational force occurred in the rotation member 81 by the urging force of the tension coil spring 82 is transmitted to the supply side winding core 76 by the frictional force between the supply side friction member 85 and the rotation member 81 urged by the compression coil spring 87 through the supply side friction member 85, the holding member 84 and the attaching member 78 to eliminate slacking of the release paper 3 which may be occurred in the label cartridge 7.

(Sticking Operation of Adhesive Label)

Figure 14A:
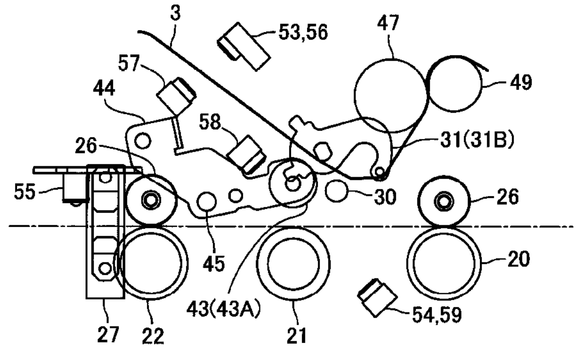
FIGS. 14(A), 14(B) and 14(C) are explanatory views showing a sticking operation of an adhesive label in a label sticking apparatus shown in FIG. 1.
Figure 14B:
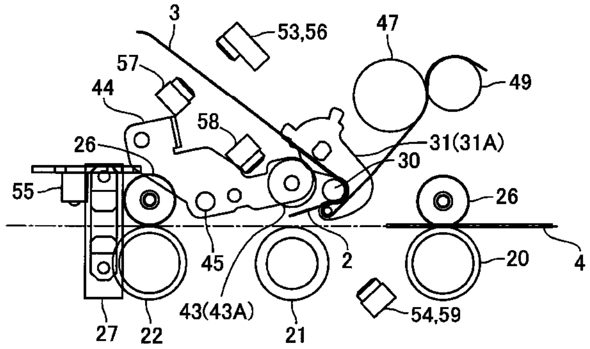
Figure 14C:
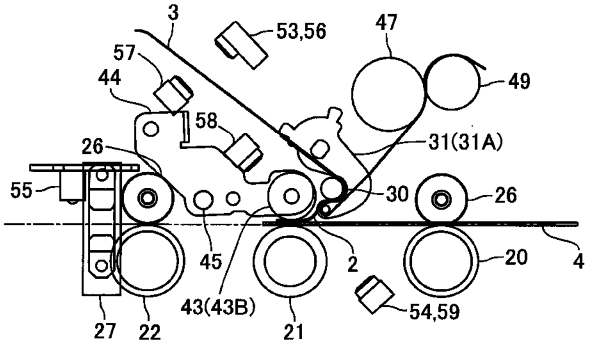

FIGS. 14(A), 14(B) and 14(C) are explanatory views showing a sticking operation of an adhesive label 2 in the label sticking apparatus 1 shown in FIG. 1. FIG. 14(A) is a view showing a state before a sticking operation of an adhesive label 2 is started, FIG. 14(B) is a view showing a state that a tip end side of an adhesive label 2 is peeled from a release paper 3, and FIG. 14(C) is a view showing a state that an adhesive label 2 is pressed against a card 4 by a pressing roller 43.

In the label sticking apparatus 1, for example, sticking of an adhesive label 2 to a card 4 is performed as described below. First, as shown in FIG. 14(A), it is confirmed that the movable member 31 is located at the bending relaxing position 31B by using the movable member detection mechanism 34 and it is confirmed that a card 4 is not existed in the card feeding passage 15 by using the card detection mechanism 27. In this case, the pressing roller 43 is located at the retreated position 43A. After that, it is confirmed whether a tip end of an adhesive label 2 temporarily adhered on the release paper 3 is detected by the label position detection mechanism 53 or not.

In a case that a tip end of an adhesive label 2 is detected by the label position detection mechanism 53, a sticking operation of an adhesive label 2 is performed. On the other hand, in a case that a tip end of an adhesive label 2 is not detected by the label position detection mechanism 53, the release paper 3 is fed toward the release paper collecting part 9 until a tip end of an adhesive label 2 is detected by the label position detection mechanism 53 (in other words, a head point of an adhesive label 2 is detected) and then, a sticking operation of an adhesive label 2 is performed.

In the sticking operation of an adhesive label 2, first, the movable member 31 is moved to the bending position 31A. After that, the release paper 3 is fed toward the release paper collecting part 9. When the release paper 3 is fed toward the release paper collecting part 9, as shown in FIG. 14(B), a tip end side of an adhesive label 2 is peeled from the release paper 3. The feeding operation of the release paper 3 is performed by the label tip end detection mechanism 54 until the tip end of the adhesive label 2 peeled from the release paper 3 is detected and, when the tip end of the adhesive label 2 is detected by the label tip end detection mechanism 54, the release paper 3 is stopped.

After that, a card 4 is fed toward the rear side. Specifically, a card 4 is fed to a position where a starting end of a predetermined label sticking position of the card 4 is disposed on a lower side with respect to the tip end of the adhesive label 2 and the card 4 is stopped. After that, as shown in FIG. 14(C), the pressing roller 43 is moved to the pressing position 43B. When the pressing roller 43 is moved to the pressing position 43B, the pressing roller 43 abuts with the counter-adhesive face of the adhesive label 2 and the adhesive label 2 is pressed on the card 4.

After that, the adhesive label 2 is peeled from the release paper 3 while feeding of the release paper 3 and feeding of the card 4 are synchronized with each other and the peeled adhesive label 2 is stuck on the card 4. When sticking of the adhesive label 2 to a card 4 is finished, the pressing roller 43 is moved to the retreated position 43A and the movable member 31 is moved to the bending relaxing position 31 B. Further, the release paper 3 is fed until a tip end of an adhesive label 2 is detected by the label position detection mechanism 53 and then the release paper 3 is stopped.

On the other hand, the card 4 is fed until the card 4 is ejected from the label sticking apparatus 1. In this case, a bar-code pattern 2_a_ of the adhesive label 2 which is stuck on the card 4 is passed under the label sticking detection mechanism 55. When the bar-code pattern 2_a_ of the adhesive label 2 is passed under the label sticking detection mechanism 55, a predetermined number of on-off signals is repeatedly outputted from the label sticking detection mechanism 55.

(Principal Effects in this Embodiment)

As described above, the label peeling mechanism 12 in this embodiment includes the movable member 31 which is capable of turning between the bending position 31A where the release paper 3 is bent so that an adhesive label 2 is peeled from the release paper 3 and the bending relaxing position 31B where a bending state of the release paper 3 is relaxed so that an adhesive label 2 is not peeled from the release paper 3. Therefore, in a state that the movable member 31 is moved to the bending relaxing position 31B, the release paper 3 can be fed toward the release paper collecting part 9 by the release paper feed mechanism 14 without peeling an adhesive label 2 from the release paper 3.

Accordingly, in a case that a tip end of an adhesive label 2 temporarily adhered to the release paper 3 has passed through a position between the light emitting part 56 and the light receiving part 57 structuring the label position detection mechanism 53 due to some cause (in other words, in a case that a tip end of an adhesive label 2 has passed through a predetermined reference position), a tip end of the next adhesive label 2 can be fed to the reference position without peeling the adhesive label 2 whose tip end has passed through the reference position. As a result, in this embodiment, in a case that a tip end of an adhesive label 2 which is temporarily adhered to the release paper 3 has passed through the reference position, the release paper 3 is not required to be returned to the release paper supply part 8 by the release paper feed mechanism 14 and a tip end of an adhesive label 2 can be aligned with the reference position without peeling an adhesive label 2 from the release paper 3.

In this embodiment, the label cartridge 7 includes the tension coil spring 82 which urges the rotation member 81 in the clockwise direction. Further, the supply side friction member 85 is urged toward the rotation member 81 by the compression coil spring 87 so that the rotation member 81 is turned together with the supply side winding core 76 up to the rotation restriction position in the counterclockwise direction at the time of supplying of the release paper 3. Further, a frictional force between the supply side friction member 85 and the rotation member 81 based on an urging force of the compression coil spring 87 is larger than a slip force between the supply side friction member 85 and the rotation member 81 based on the urging force of the tension coil spring 82 until the rotation member 81 is turned up to the rotation restriction position in the counterclockwise direction. Therefore, when the rotation member 81 is turned up to the rotation restriction position in the counterclockwise direction together with the supply side winding core 76, the urging force to the clockwise direction which is stored in the tension coil spring 82 is transmitted to the supply side winding core 76 through the supply side friction member 85. Accordingly, even when the label sticking apparatus 1 is not provided with a separate mechanism for applying a tensile force to the release paper 3, a tensile force is applied to the release paper 3. As a result, in this embodiment, an adhesive label 2 is appropriately peeled from the release paper 3 while simplifying the structure of the label sticking mechanism 1.

In this embodiment, the outer diameter of the release paper feed roller 47, the outer diameter of the wind-up side winding core 65, the speed reducing ratio of the feed roller drive mechanism 48, and the like are set so that a circumferential speed of the wind-up side winding core 65 is faster than a circumferential speed of the release paper feed roller 47. Further, the wind-up side friction member 72 is urged toward the gear 70 by the compression coil spring 73 so that, when a tensile force of the release paper 3 between the release paper feed roller 47 and the wind-up side winding core 65 is less than a predetermined magnitude, the gear 70 and the wind-up side friction member 72 are frictionally engaged with each other and the gear 70 and the wind-up side winding core 65 are integrally rotated with each other and, when the tensile force of the release paper 3 between the release paper feed roller 47 and the wind-up side winding core 65 is not less than the predetermined magnitude, slip occurs between the gear 70 and the wind-up side friction member 72. Therefore, the release paper 3 is wound up in the release paper collecting part 9 without generating an excessive tensile force in the release paper 3 and without loosening the release paper 3.

On the other hand, since the release paper supply part 8 and the release paper collecting part 9 are structured as described above, if the supply side winding core 76 and the wind-up side winding core 65 are structured to be capable of being rotated in a clockwise direction which is a reverse direction to a rotating direction when the release paper 3 is fed from the release paper supply part 8 to the release paper collecting part 9*a*, the structure of the release paper supply part 8 and the release paper collecting part 9 becomes complicated. However, in this embodiment, in a case that a tip end of an adhesive label 2 temporarily adhered on the release paper 3 has passed through a reference position, a tip end of an adhesive label 2 can be aligned with the reference position without returning the release paper 3 to the release paper supply part 8 by the release paper feed mechanism 14 and without peeling the adhesive label 2 from the release paper 3. Therefore, a complicated mechanism for rotating the supply side winding core 76 and the wind-up side winding core 65 in a clockwise direction is not required to provide in the release paper supply part 8 and the release paper collecting part 9. Accordingly, in this embodiment, a structure of the release paper supply part 8 and the release paper collecting part 9 is simplified.

In this embodiment, the movable member 31 is movable to the bending relaxing position 31B where the shaft member 35 is disposed on a front upper side with respect to the fixed shaft 30. Further, in this embodiment, the upper frame part 17 is turnable with respect to the lower main body part 18 between the closed position 17A where the label cartridge 7 is sandwiched and fixed between the upper frame part 17 and the lower main body part 18 and the open position 17B where the upper side of the label cartridge 7 is opened so that the label cartridge 7 is capable of being detached to the upper side. Therefore, although the release paper 3 can be bent by the movable member 31 to peel an adhesive label 2 from the release paper 3, when the movable member 31 is moved to the bending relaxing position 31B and the upper frame part 17 is turned to the open position 17B with respect to the lower main body part 18, the label cartridge 7 can be detached or attached. In other words, in this embodiment, although the release paper 3 can be bent by the movable member 31 to peel an adhesive label 2 from the release paper 3, the label cartridge 7 can be easily detached from the main body part 6 and the label cartridge 7 can be easily attached to the main body part 6.

Further, in this embodiment, the label cartridge 7 can be detached to an upper side with respect to the lower main body part 18 and the label cartridge 7 can be attached to the lower main body part 18 from an upper side. Therefore, for example, even when other apparatuses are disposed closely around the label sticking apparatus 1, the label cartridge 7 can be easily detached and easily attached. Further, the release paper 3 can be set to the release paper supply part 8 and the release paper collecting part 9 in a state that the label cartridge 7 is detached from the main body part 6 and thus the release paper 3 is easily set.

In this embodiment, the movable member 31 is turnable between the bending position 31A and the bending relaxing position 31B and the shaft holding member 36 is formed in a bent hook shape so as to prevent interference with the fixed shaft 30 when the movable member 31 is turned from the bending relaxing position 31B to the bending position 31A. Therefore, in comparison with a case that the movable member 31 is straightly moved between the bending position and the bending relaxing position, arrangement space of the movable member 31 can be narrowed and, as a result, the size of the label sticking apparatus 1 can be reduced.

In this embodiment, the label sticking apparatus 1 includes the label tip end detection mechanism 54 for detecting a tip end of an adhesive label 2 which is peeled from the release paper 3 by the label peeling mechanism 12. Therefore, a starting end of a predetermined label sticking position of a card 4 and a tip end of an adhesive label 2 can be aligned with each other with a high degree of accuracy and, as a result, accuracy of the sticking position of the adhesive label 2 to a card 4 can be enhanced. Further, it can be detected whether a tip end side of an adhesive label 2 is peeled by the label peeling mechanism 12 or not and thus a sticking failure of an adhesive label 2 is prevented beforehand.

In this embodiment, the pressing roller 43 is formed with the groove part 43*a* through which light is passed from the light emitting element toward the light receiving element that structure the label tip end detection mechanism 54. Therefore, the label tip end detection mechanism 54 and the pressing roller 43 can be disposed at a further nearer position to a tip end side of an adhesive label 2 which is peeled from the release paper 3 by the label peeling mechanism 12. Accordingly, in this embodiment, even when a peeled amount of a tip end side of an adhesive label 2 from the release paper 3 is small, the tip end of the adhesive label 2 can be detected appropriately by the label tip end detection mechanism 54 and the tip end side of the adhesive label 2 can be pressed against a card 4 appropriately by the pressing roller 43. As a result, a sticking failure of an adhesive label 2 can be prevented effectively. Further, an adhesive label 2 whose total length is short can be appropriately stuck to a card 4.

In this embodiment, the label sticking apparatus 1 includes the label sticking detection mechanism 55 for detecting that an adhesive label 2 has been stuck on a card 4. Therefore, a sticking failure of an adhesive label 2 can be detected appropriately. Further, the label sticking detection mechanism 55 in this embodiment is a reflection type optical sensor which detects a bar-code pattern 2*a* printed on a counter-adhesive face of an adhesive label 2. Therefore, it can be detected whether or not an adhesive label 2 is appropriately stuck on a card 4 without being folded by detecting on-off signals outputted from the label sticking detection mechanism 55. Further, a sticking failure of an adhesive label 2 can be detected appropriately regardless of ground colors of a card 4.

Other Embodiments

Although the present invention has been shown and described with reference to a specific embodiment, various changes and modifications will be apparent to those skilled in the art from the teachings herein.

In the embodiment described above, the movable member 31 is turnable between the bending position 31A and the bending relaxing position 31B. However, the present invention is not limited to this embodiment. For example, the movable member 31 may be movable in a straight line manner between the bending position and the bending relaxing position.

In the embodiment described above, the label peeling mechanism 12 includes the fixed shaft 30 which is fixed to the lower main body part 18. However, the present invention is not limited to this embodiment. For example, the label peeling mechanism 12 may include a movable shaft which is capable of being relatively moved to the lower main body part 18 instead of providing the fixed shaft 30. In this case, when the movable member 31 is located at the bending position 31A, the movable shaft is abutted with a surface of the release paper 3 so that the release paper 3 is bent together with the movable member 31 so as to peel an adhesive label 2 from the release paper 3.

In the embodiment described above, a bar-code pattern 2*a* is printed on a counter-adhesive face of an adhesive label 2 and the label sticking detection mechanism 55 detects the bar-code pattern 2*a*. However, the present invention is not limited to this embodiment. For example, in a case that an adhesive label 2 having been stuck on a card 4 is capable of being detected by utilizing the difference between the reflection factor of light of a card 4 and the reflection factor of light of an adhesive label 2, a bar-code pattern 2*a* is not required to be printed on a counter-adhesive face of an adhesive label 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A label sticking apparatus in which an adhesive label is peeled from a release paper formed in a belt shape on which a plurality of adhesive labels is temporarily adhered at a predetermined interval and the adhesive label is stick on an adhered medium, the label sticking apparatus comprising:

a release paper supply part in which a release paper before the adhesive label is peeled is held;

a release paper collecting part in which the release paper after the adhesive label is peeled is held;

a release paper feed mechanism structured to feed the release paper from the release paper supply part to the release paper collecting part;

a label peeling mechanism structured to bend the release paper and peel the adhesive label from the release paper between the release paper supply part and the release paper collecting part; and a label pressing mechanism structured to press the adhesive label peeled by the label peeling mechanism against the adhered medium;

wherein the label peeling mechanism comprises a movable member which is movable between a bending position where the release paper is bent so that the adhesive label is peeled from the release paper and a bending relaxing position where a bending state of the release paper is relaxed so that the adhesive label is not peeled from the release paper;

wherein in a case that a face of the release paper on a side where the adhesive label is temporarily adhered is referred to as a front face, and that a face of the release paper on an opposite side to the front face is referred to as a rear face;

the label peeling mechanism comprises a fixed shaft which is disposed in a passing route of the release paper from the release paper supply part to the release paper collecting part and is structured to abut with the front face of the release paper when the movable member is located at the bending position;

the movable member located at the bending position is abutted with the rear face of the release paper; and the release paper is bent by the movable member located at the bending position and the fixed shaft to peel the adhesive label from the release paper.

2. The label sticking apparatus according to claim 1, further comprising a medium feeding passage through which the adhered medium is fed;

wherein when the movable member is located at the bending position, an abutting portion of the movable member with the release paper is located at a nearer position to the medium feeding passage than the fixed shaft; and wherein when the movable member is located at the bending relaxing position, the abutting portion of the movable member with the release paper is located at a further separated position from the medium feeding passage with respect to the fixed shaft.

3. The label sticking apparatus according to claim 1, wherein the movable member comprises a shaft member structured to abut with the rear face of the release paper and a shaft holding member which holds the shaft member;

the shaft holding member is turnable between the bending position and the bending relaxing position; and the shaft holding member is formed in a bent hook shape so as to prevent interference with the fixed shaft when the movable member is turned from the bending relaxing position to the bending position.

4. The label sticking apparatus according to claim 1, further comprising:

a label cartridge to which the release paper supply part and the release paper collecting part are attached; and a main body part to which the label cartridge is capable of being attached and from which the label cartridge is capable of being detached wherein the main body part comprises an upper frame part which structures an upper face portion of the main body part and a lower main body part which turnably holds the upper frame part;

wherein the movable member is movably held by the upper frame part; and wherein the upper frame part is turnable with respect to the lower main body part between a closed position where the label cartridge is sandwiched and fixed between the upper frame part and the lower main body part and an open position where an upper side of the label cartridge is opened so that the label cartridge is capable of being detached to an upper side.

5. The label sticking apparatus according to claim 1, wherein in a case that a face of the adhesive label on an opposite side to an adhesive face is a counter-adhesive face;

the label pressing mechanism comprises:

a pressing roller which is capable of being abutted with the counter-adhesive face of the adhesive label; and a pressing roller moving mechanism structured to move the pressing roller between a pressing position where the pressing roller is abutted with the counter-adhesive face of the adhesive label to press the adhesive label against the adhered medium and a retreated position where the pressing roller is separated from the counter-adhesive face of the adhesive label.

6. The label sticking apparatus according to claim 1, further comprising a label sticking detection mechanism structured to detect that the adhesive label has been stuck on the adhered medium.

7. The label sticking apparatus according to claim 6, wherein in a case that a face of the adhesive label on an opposite side to an adhesive face is a counter-adhesive face;

a bar-code pattern in a bar-code shape is printed on the counter-adhesive face of the adhesive label; and the label sticking detection mechanism is a reflection type optical sensor for detecting the bar-code pattern.

8. The label sticking apparatus according to claim 1, wherein the movable member comprises a shaft member structured to abut with the rear face of the release paper and a shaft holding member which holds the shaft member;

the shaft holding member is turnable between the bending position and the bending relaxing position; and the shaft member of the shaft holding member located at the bending position is abutted with the rear face of the release paper, and the release paper is bent by the shaft member located at the bending position and the fixed shaft to peel the adhesive label from the release paper.

9. A label sticking apparatus in which an adhesive label is peeled from a release paper formed in a belt shape on which a plurality of adhesive labels is temporarily adhered at a predetermined interval and the adhesive label is stick on an adhered medium, the label sticking apparatus comprising:

a release paper supply part in which a release paper before the adhesive label is peeled is held;

a release paper collecting part in which the release paper after the adhesive label is peeled is held;

a release paper feed mechanism structured to feed the release paper from the release paper supply part to the release paper collecting part;

a label peeling mechanism structured to bend the release paper and peel the adhesive label from the release paper between the release paper supply part and the release paper collecting part;

a label pressing mechanism structured to press the adhesive label peeled by the label peeling mechanism against the adhered medium;

a label tip end detection mechanism structured to detect a tip end of the adhesive label which is peeled from the release paper by the label peeling mechanism;

wherein the label peeling mechanism comprises a movable member which is movable between a bending position where the release paper is bent so that the adhesive label is peeled from the release paper and a bending relaxing position where a bending state of the release paper is relaxed so that the adhesive label is not peeled from the release paper;

wherein in a case that a face of the adhesive label on an opposite side to an adhesive face is a counter-adhesive face;

the label pressing mechanism comprises a pressing roller which is capable of being abutted with the counter-adhesive face of the adhesive label;

the label tip end detection mechanism comprises a light emitting element and a light receiving element which are disposed so as to interpose a tip end side of the adhesive label peeled from the release paper by the label peeling mechanism; and the pressing roller is formed with a groove part so as to be recessed to an inner side in a radial direction through which light from the light emitting element toward the light receiving element is passed.

10. A label sticking apparatus in which an adhesive label is peeled from a release paper formed in a belt shape on which a plurality of adhesive labels is temporarily adhered at a predetermined interval and the adhesive label is stick on an adhered medium, the label sticking apparatus comprising:

a release paper supply part in which a release paper before the adhesive label is peeled is held;

a release paper collecting part in which the release paper after the adhesive label is peeled is held;

a release paper feed mechanism structured to feed the release paper from the release paper supply part to the release paper collecting part;

a label peeling mechanism structured to bend the release paper and peel the adhesive label from the release paper between the release paper supply part and the release paper collecting part; and a label pressing mechanism structured to press the adhesive label peeled by the label peeling mechanism against the adhered medium;

wherein the label peeling mechanism comprises a movable member which is movable between a bending position where the release paper is bent so that the adhesive label is peeled from the release paper and a bending relaxing position where a bending state of the release paper is relaxed so that the adhesive label is not peeled from the release paper;

wherein the release paper supply part comprises:

a supply side winding core around which the release paper is wound;

a supply side rotation shaft and a supply side friction member which are integrally rotated with the supply side winding core;

a rotation member which is turnable with respect to the supply side rotation shaft and is held by the supply side rotation shaft;

a supply side friction urging member which urges the supply side friction member toward the rotation member; and a rotation urging member which urges the rotation member to a counter-supply rotating direction which is an opposite direction to a supply rotating direction that is a rotating direction of the supply side winding core when the release paper is fed from the release paper supply part to the release paper collecting part;

wherein the supply side friction member is urged toward the rotation member by the supply side friction urging member so that the rotation member is turned over a predetermined angle in the supply rotating direction together with the supply side winding core when the release paper is fed from the release paper supply part to the release paper collecting part.

11. The label sticking apparatus according to claim 10, wherein in a case that a face of the release paper on a side where the adhesive label is temporarily adhered is referred to as a front face, and that a face of the release paper on an opposite side to the front face is referred to as a rear face;

the label peeling mechanism comprises a fixed shaft which is disposed in a passing route of the release paper from the release paper supply part to the release paper collecting part and is structured to abut with the front face of the release paper when the movable member is located at the bending position;

the movable member located at the bending position is abutted with the rear face of the release paper; and the release paper is bent by the movable member located at the bending position and the fixed shaft to peel the adhesive label from the release paper.

12. The label sticking apparatus according to claim 10, wherein in a case that a face of the adhesive label on an opposite side to an adhesive face is a counter-adhesive face;

the label pressing mechanism comprises:

a pressing roller which is capable of being abutted with the counter-adhesive face of the adhesive label; and a pressing roller moving mechanism structured to move the pressing roller between a pressing position where the pressing roller is abutted with the counter-adhesive face of the adhesive label to press the adhesive label against the adhered medium and a retreated position where the pressing roller is separated from the counter-adhesive face of the adhesive label.

13. The label sticking apparatus according to claim 10, wherein in a case that a face of the release paper on a side where the adhesive label is temporarily adhered is referred to as a front face, and that a face of the release paper on an opposite side to the front face is referred to as a rear face;

the label peeling mechanism comprises a fixed shaft which is disposed in a passing route of the release paper from the release paper supply part to the release paper collecting part and is structured to abut with the front face of the release paper when the movable member is located at the bending position;

the movable member located at the bending position is abutted with the rear face of the release paper; and the release paper is bent by the movable member located at the bending position and the fixed shaft to peel the adhesive label from the release paper.

14. A label sticking apparatus in which an adhesive label is peeled from a release paper formed in a belt shape on which a plurality of adhesive labels is temporarily adhered at a predetermined interval and the adhesive label is stick on an adhered medium, the label sticking apparatus comprising:

a release paper supply part in which a release paper before the adhesive label is peeled is held;

a release paper collecting part in which the release paper after the adhesive label is peeled is held;

a release paper feed mechanism structured to feed the release paper from the release paper supply part to the release paper collecting part;

a label peeling mechanism structured to bend the release paper and peel the adhesive label from the release paper between the release paper supply part and the release paper collecting part; and a label pressing mechanism structured to press the adhesive label peeled by the label peeling mechanism against the adhered medium;

wherein the label peeling mechanism comprises a movable member which is movable between a bending position where the release paper is bent so that the adhesive label is peeled from the release paper and a bending relaxing position where a bending state of the release paper is relaxed so that the adhesive label is not peeled from the release paper;

wherein the release paper feed mechanism comprises:

a release paper feed roller structured to feed the release paper toward the release paper collecting part; and a feed roller drive mechanism structured to drive at least the release paper feed roller;

the release paper collecting part comprises:

a wind-up side winding core around which the release paper is wound;

a wind-up side rotation shaft and a wind-up side friction member which are integrally rotated with the wind-up side winding core;

a transmission member which is rotatable with respect to the wind-up side rotation shaft and is held by the wind-up side rotation shaft and connected with the feed roller drive mechanism to transmit power of the feed roller drive mechanism to the wind-up side winding core; and a wind-up side friction urging member which urges the wind-up side friction member toward the transmission member;

the release paper feed roller and the wind-up side winding core are driven so that a circumferential speed of the wind-up side winding core is faster than a circumferential speed of the release paper feed roller; and the wind-up side friction member is urged toward the transmission member by the wind-up side friction urging member so that, when a tensile force of the release paper between the release paper feed roller and the wind-up side winding core is less than a predetermined magnitude, the wind-up side winding core is integrally rotated with the transmission member and, when a tensile force of the release paper between the release paper feed roller and the wind-up side winding core is not less than the predetermined magnitude, slip occurs between the transmission member and the wind-up side friction member.

15. The label sticking apparatus according to claim 14, wherein in a case that a face of the adhesive label on an opposite side to an adhesive face is a counter-adhesive face;

the label pressing mechanism comprises:

a pressing roller which is capable of being abutted with the counter-adhesive face of the adhesive label; and a pressing roller moving mechanism structured to move the pressing roller between a pressing position where the pressing roller is abutted with the counter-adhesive face of the adhesive label to press the adhesive label against the adhered medium and a retreated position where the pressing roller is separated from the counter-adhesive face of the adhesive label.

16. A label sticking apparatus in which an adhesive label is peeled from a release paper formed in a belt shape on which a plurality of adhesive labels is temporarily adhered at a predetermined interval and the adhesive label is stick on an adhered medium, the label sticking apparatus comprising:

a release paper supply part in which a release paper before the adhesive label is peeled is held;

a release paper collecting part in which the release paper after the adhesive label is peeled is held;

a release paper feed mechanism structured to feed the release paper from the release paper supply part to the release paper collecting part;

a label peeling mechanism structured to bend the release paper and peel the adhesive label from the release paper between the release paper supply part and the release paper collecting part;

a label pressing mechanism structured to press the adhesive label peeled by the label peeling mechanism against the adhered medium;

a label cartridge to which the release paper supply part and the release paper collecting part are attached; and a main body part to which the label cartridge is capable of being attached and from which the label cartridge is capable of being detached, wherein the label peeling mechanism comprises a movable member which is movable between a bending position where the release paper is bent so that the adhesive label is peeled from the release paper and a bending relaxing position where a bending state of the release paper is relaxed so that the adhesive label is not peeled from the release paper;

wherein the main body part comprises an upper frame part which structures an upper face portion of the main body part and a lower main body part which turnably holds the upper frame part;

wherein the movable member is movably held by the upper frame part; and wherein the upper frame part is turnable with respect to the lower main body part between a closed position where the label cartridge is sandwiched and fixed between the upper frame part and the lower main body part and an open position where an upper side of the label cartridge is opened so that the label cartridge is capable of being detached to an upper side.

17. The label sticking apparatus according to claim 16, further comprising a medium feeding passage through which the adhered medium is fed, wherein when the movable member is located at the bending position, an abutting portion of the movable member with the release paper is located at a nearer position to the medium feeding passage than the fixed shaft; and wherein when the movable member is located at the bending relaxing position, the abutting portion of the movable member with the release paper is located at a further separated position from the medium feeding passage with respect to the fixed shaft.

18. The label sticking apparatus according to claim 16, wherein in a case that a face of the adhesive label on an opposite side to an adhesive face is a counter-adhesive face;

the label pressing mechanism comprises:

a pressing roller which is capable of being abutted with the counter-adhesive face of the adhesive label; and a pressing roller moving mechanism structured to move the pressing roller between a pressing position where the pressing roller is abutted with the counter-adhesive face of the adhesive label to press the adhesive label against the adhered medium and a retreated position where the pressing roller is separated from the counter-adhesive face of the adhesive label.

* * * * *